(12) United States Patent
Nakata et al.

(10) Patent No.: US 9,778,767 B2
(45) Date of Patent: Oct. 3, 2017

(54) DISPLAY CONTROL APPARATUS AND CONTROL METHOD OF DISPLAY CONTROL APPARATUS

(71) Applicant: CANON KABUSHIKI KAISHA, Tokyo (JP)

(72) Inventors: Takeshi Nakata, Kawasaki (JP); Ryu Wakui, Tokyo (JP); Hideki Narushima, Fujisawa (JP); Maiko Sato, Tokyo (JP); Natsuko Miyazaki, Mitaka (JP); Shingo Yamazaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 424 days.

(21) Appl. No.: 13/829,964

(22) Filed: Mar. 14, 2013

(65) Prior Publication Data

US 2013/0249836 A1 Sep. 26, 2013

(30) Foreign Application Priority Data

Mar. 26, 2012 (JP) ................. 2012-070347

(51) Int. Cl.
*G06F 3/041* (2006.01)
*G06F 1/16* (2006.01)
*H04N 5/225* (2006.01)
*H04N 5/232* (2006.01)

(52) U.S. Cl.
CPC ............ *G06F 3/041* (2013.01); *G06F 1/1616* (2013.01); *G06F 1/1643* (2013.01); *G06F 1/1677* (2013.01); *H04N 5/225* (2013.01); *H04N 5/23216* (2013.01); *H04N 5/2251* (2013.01); *H04N 5/23293* (2013.01)

(58) Field of Classification Search
None
See application file for complete search history.

(56) References Cited

U.S. PATENT DOCUMENTS

| 8,266,550 B1* | 9/2012 | Cleron .................. G06F 1/1633 345/173 |
| 2005/0280629 A1* | 12/2005 | Matsumoto .................. 345/156 |
| 2009/0044151 A1* | 2/2009 | Ichii et al. .................. 715/854 |
| 2011/0098019 A1* | 4/2011 | Fujii .............................. 455/411 |

(Continued)

FOREIGN PATENT DOCUMENTS

| CN | 1578411 A | 2/2005 |
| CN | 102215344 A | 10/2011 |
| JP | 2008-305140 A | 12/2008 |

*Primary Examiner* — William Boddie
*Assistant Examiner* — Jeffrey A Parker
(74) *Attorney, Agent, or Firm* — Canon U.S.A., Inc. IP Division

(57) ABSTRACT

To achieve an improved touch operation, a display control apparatus includes a monitor unit provided with a display unit and rotatably connected to a main body via a hinge portion, a touch panel configured to detect a touch operation on the display unit, a variable angle state detection unit configured to detect a position of the monitor unit, and a system control unit configured to display a Q button to be used for releasing lock at a position nearer to the hinge portion than other display items when it is determined that the monitor unit is moved from a first position to a second position based on the detection result of the variable angle state detection unit.

19 Claims, 11 Drawing Sheets

(56) References Cited

U.S. PATENT DOCUMENTS

2012/0139856 A1* 6/2012 Ise ............... G06F 3/04883
  345/173
2013/0321339 A1* 12/2013 Irie ............... G06F 1/1675
  345/174

* cited by examiner

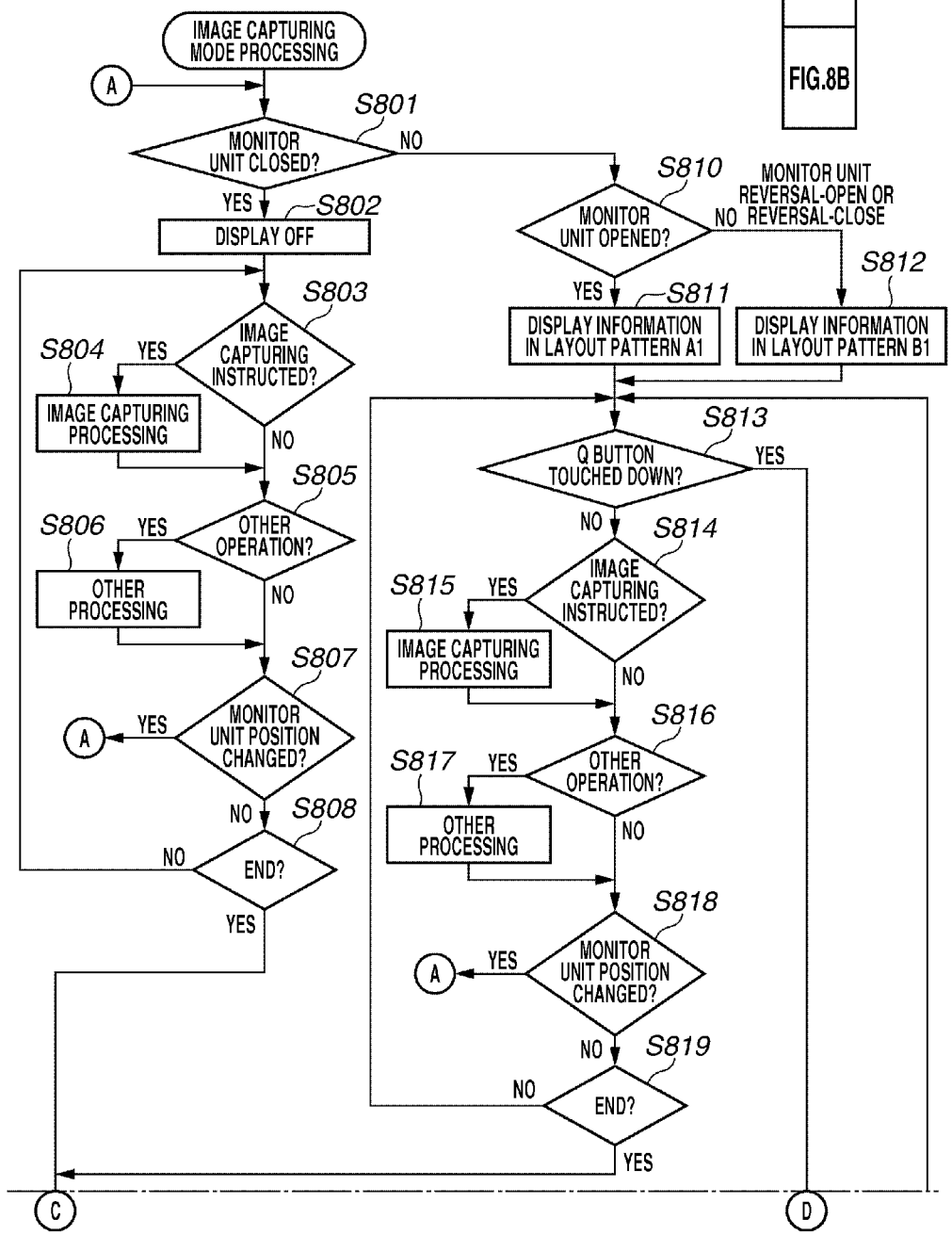

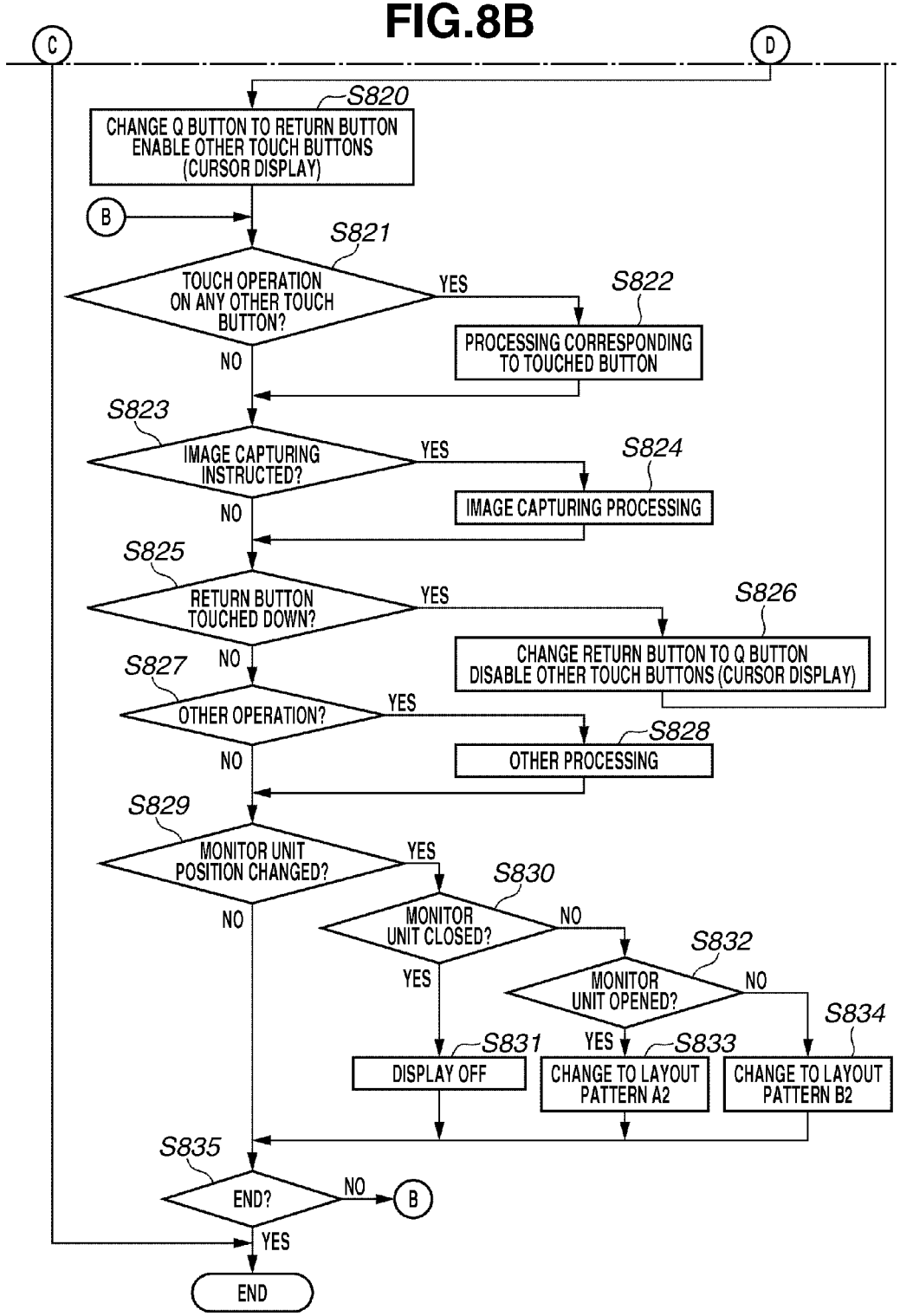

DISPLAY CONTROL APPARATUS AND CONTROL METHOD OF DISPLAY CONTROL APPARATUS

BACKGROUND OF THE INVENTION

Field of the Invention

The present invention relates to a display control apparatus with a variable angle type display unit allowing touch operation, opening and closing, and angle adjustment, and a control method of the display control unit.

Description of the Related Art

Generally, an image capturing apparatus such as a digital camera and a video camera is provided with a liquid crystal display or an organic light emitting display for setting the image capturing apparatus or checking a captured image. In addition, there is an image capturing apparatus provided with a variable angle monitor in which a unit including a display rotatable with respect to the main body is attached to the main body of the image capturing apparatus.

With the angle adjustment of the variable angle monitor, visual recognition of the image capturing target is possible when capturing an image in a low-angle or a high-angle. Further, electronic apparatuses having a touch panel allowing touch operation to the display, and capable of setting various settings and giving instructions of various operations according to the touch operation to the touch panel have been widely used.

Japanese Patent Application Laid-open No. 2008-305140 discusses a digital camera including a variable angle monitor with a touch panel. With the digital camera, when the variable angle monitor is closed to expose the display screen with respect to the back side of the main body, the same functions as the operation switches disposed on the back side of the main body are substituted by the touch buttons on the touch panel.

In the conventional technique discussed in Japanese Patent Application Laid-open No. 2008-305140, when a user tries to grip to rotate the variable angle monitor, the user may touch the touch panel unintentionally. In this case, unintentional operations may be performed.

SUMMARY OF THE INVENTION

The present invention is directed to a display control apparatus capable of reducing erroneous operations cause by touching a touch panel by mistake, when a variable angle monitor with a touch panel is opened or closed, or angle adjustment thereof is performed.

According to an aspect of the present invention, a display control apparatus includes a monitor unit provided with a display unit and rotatably connected to a main body via a connection portion, a touch detection unit configured to detect a touch operation on the display unit, a position detection unit configured to detect a relative position of the monitor unit with respect to the main body, and a control unit configured to control a display of the display unit to be updated so that a first display item allowing touch operation on a displayed area where the first display item is displayed is disposed at a position nearer to the connection portion than a second display item not allowing touch operation on an displayed area where the first display item is displayed, in response to a change of the relative position detected by the position detection unit from a first position to a second position.

According to the present invention, when the variable angle monitor with a touch panel is opened or closed, or an angle adjustment is performed, erroneous operations caused by touching the touch panel by mistake can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8 (8A and 8B) is a flowchart illustrating processing to realize a control method according to an exemplary embodiment of the present invention.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1A:
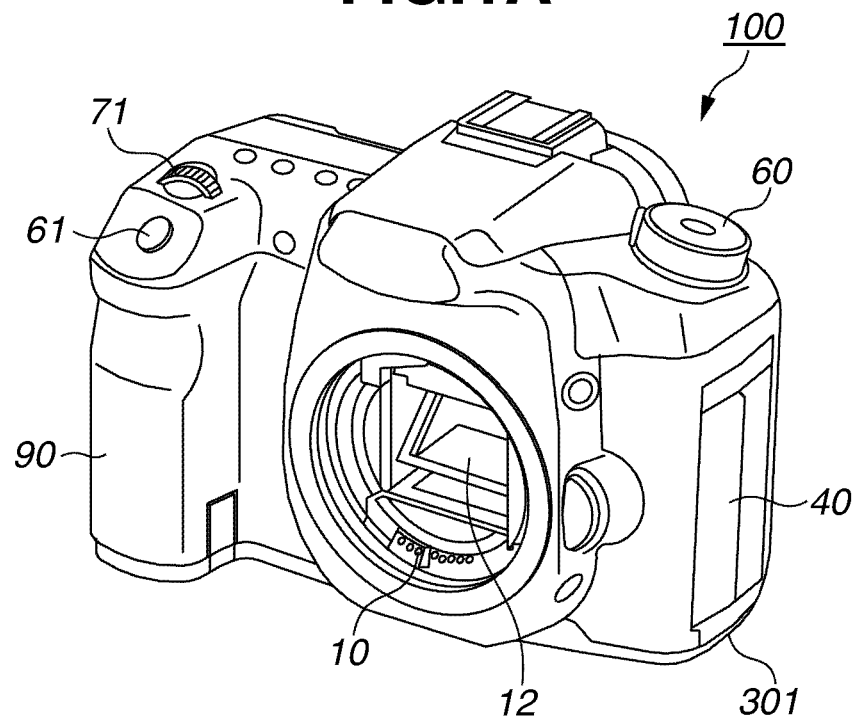
FIGS. 1A and 1B are external views illustrating a digital camera as a display control apparatus according to a first exemplary embodiment of the present invention.
Figure 1B:
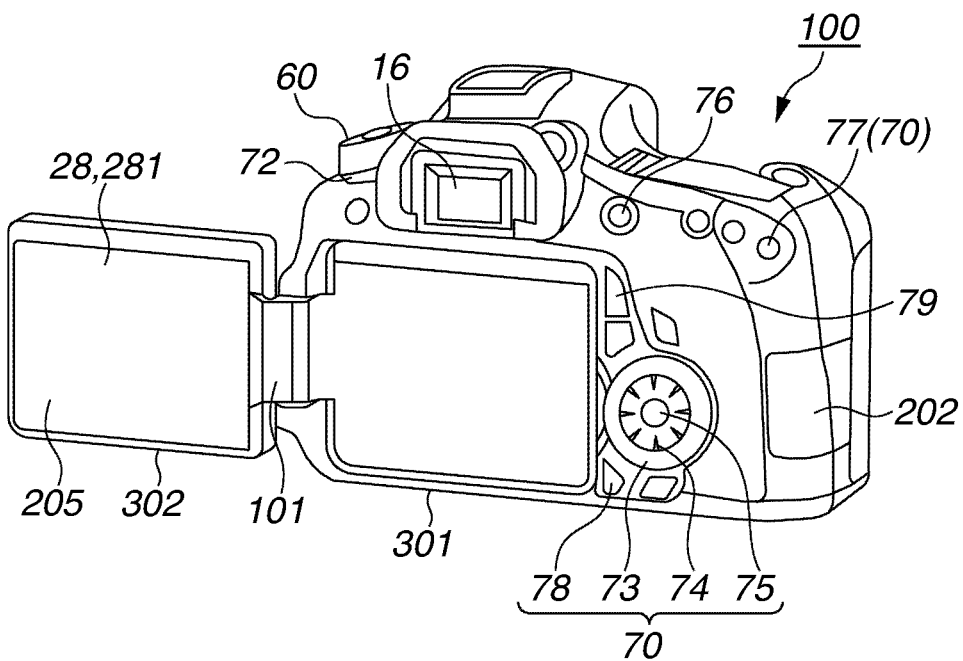

Referring to FIGS. 1A and 1B, an overall configuration of a digital camera 100 as a display control apparatus according to a first exemplary embodiment of the present invention is described. FIGS. 1A and 1B are external views illustrating the digital camera 100 as the display control apparatus according to the first exemplary embodiment of the present invention. FIG. 1A is a perspective view illustrating the front side of the digital camera 100 and FIG. 1B is a perspective view illustrating the back side of the digital camera 100.

As illustrated in FIGS. 1A and 1B, the digital camera 100 is provided with a monitor unit 302. The monitor unit 302 is provided with a display unit 28. The display unit 28 includes a display screen 281 for displaying images and various kinds of information. As the display unit 28, a flat panel display such as a liquid crystal display panel is used.

On the display screen 281 of the display unit 28, a touch panel 205 as a touch detection unit (described below) is provided. The monitor unit 302 (the display unit 28) is so-called variable angle monitor rotatably connected to a main body 301 of the digital camera 100.

More specifically, the monitor unit 302 (display unit 28) is connected to the main body 301 of the digital camera 100 with a hinge portion 101 (connection portion) to be rotatable around a first rotation shaft L1 (described below) and a second rotation shaft L2 (described below) different from the first rotation shaft L1.

The digital camera 100 includes a mode dial 60 (mode change switch) and an operation unit 70 to be operated by a user.

The mode dial 60 (mode change switch) is a rotary switch for switching image capturing modes of the digital camera 100.

The operation unit 70 is operable by a user to function as an input unit for accepting user's operations. The operation unit 70 includes a shutter button 61, a main electronic dial 71, a power switch 72, a sub electronic dial 73, an arrow key 74, a setting button 75, a live view (LV) button 75, an enlargement button 77, a reproduction button 78, and the touch panel 205.

The shutter button 61 included in the operation unit 70 is a press-button type switch operable by a user for instructing the digital camera 100 to perform image capturing. The main electronic dial 71 included in the operation unit 70 is a rotary type switch. A user can change setting values such as a shutter speed and an aperture value by rotating the main electronic dial 71.

The power switch 72 included in the operation unit 70 is a switch for performing (switching) ON/OFF of the power supply to the digital camera 100. The sub electronic dial 73 included in the operation unit 70 is a rotary type switch provided on the back side of the main body 301. By rotating the sub electronic dial 73, a user can move a selection frame (described below) displayed on the display screen 281 of the display unit 28 and can advance images.

The arrow key 74 included in the operation unit 70 is a cruciform key (button) type switch. Each of "up", "down", "left", and "right" portion thereof can be pressed, and the arrow key 74 is provided on the back side of the main body 301. A user can perform an operation (described below) corresponding to a pressed portion of the arrow key 74. The setting button 75 included in the operation unit 70 is a press button type switch provided on the back side of the main body 301. The setting button 75 is mainly used to determine a selection item.

The LV button 76 included in the operation unit 70 is a press button type switch. In the still image capturing mode, the LV button 75 is used to switch ON/OFF of the live view (hereinbelow, referred to as "LV"). In the moving image capturing mode, the LV button 75 is used to instruct start and stop of the moving image capturing (recording).

The enlargement button 77 included in the operation unit 70 is a press button type switch for switching ON/OFF of the enlargement mode during the live view display in the image capturing mode, and in the enlargement mode, for changing the enlargement rate. Further, the enlargement button 77 enlarges the reproduced image in the reproduction mode and functions as an enlargement button to increase the enlargement rate.

The reproduction button 78 included in the operation unit 70 is a press button type switch for switching the image capturing mode and the reproduction mode. In the image capturing mode, by pressing the reproduction button 78, a user can shift the mode of the digital camera 100 to the reproduction mode and can display the latest image among the images recorded on a recording medium 200, on the display unit 28.

In addition, the operations described above are realized by a system control unit 50 (described below) detecting the operation of the operation unit 70 by a user and performing processing corresponding to the operated operation unit 70 and the operation content.

A terminal cover 40 is a member for protecting a connector (not illustrated) of a connecting cable used to connect an external apparatus (not illustrated) with the digital camera 100.

A quick return the mirror 12 (hereinbelow, referred to as a mirror 12 in short) is moved up and down by an actuator (not illustrated) controlled by the system control unit 50 (described below). The mirror 12 will be described in detail below.

A communication terminal 10 is a communication terminal for performing communication by the digital camera 100 with a lens unit 150 (described below), which is attachable and detachable to the digital camera 100).

An eyepiece finder 16 is a look-in type finder. By observing a focusing screen 19 through the eyepiece finder 16, a user can check the focusing state of an optical image of an object and the picture composition obtained through a lens unit 150.

A cover 202 a member for covering a slot capable of storing the recording medium 200.

A grip portion 90 is a holding portion for holding the digital camera 100 by a user. The grip portion 90 is formed in a shape in which a user can grip the grip portion 90 easily with the right hand when the user is ready to shoot.

Figure 2:
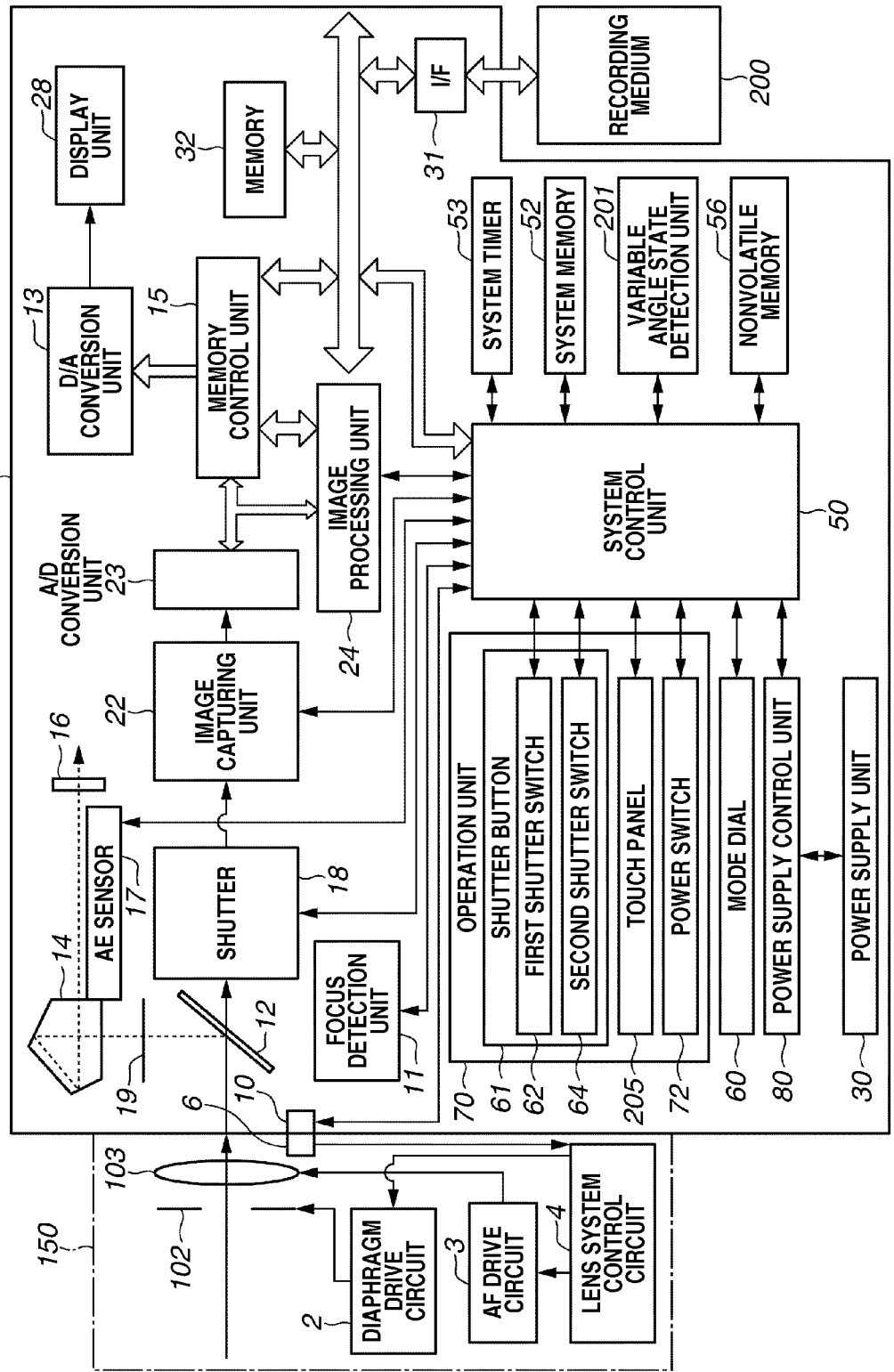
FIG. 2 is a block diagram illustrating an example configuration of the digital camera according to the first exemplary embodiment of the present invention.

Referring to FIG. 2, a function configuration of the digital camera 100 is described. FIG. 2 is block diagram illustrating a configuration example of the digital camera 100 according to the first exemplary embodiment of the present invention.

The system control unit 50 controls the entire digital camera 100. The system control unit 50 functions as a control unit for controlling the display unit 28 in control of the digital camera 100. A nonvolatile memory 56 is an electrically erasable/recordable memory and, for example, an electrically erasable programmable read-only memory (EEPROM) is used.

The nonvolatile memory 56 stores constants and programs for operation of the system control unit 50. In the present exemplary embodiment, the programs are programs used to execute the processing described below. The system control unit 50 executes the program stored in the nonvolatile memory 56, thereby realizing each processing described below according to the present exemplary embodiment.

Further, the system control unit 50 performs display control by controlling a memory 32, a digital to analog (D/A) conversion unit 13, and the display unit 28. A RAM is used for a system memory 52. The system control unit 50 loads various setting values such as constants and variables for operation and the programs read from the nonvolatile memory 56.

The lens unit 150 includes a lens system control circuit 4, an auto focus (AF) drive circuit 3, a diaphragm drive circuit 2, a diaphragm 102, and a communication terminal 6. Further, the lens unit 150 includes an interchangeable photographic lens 103. The lens unit 150 normally includes a plurality of photographic lenses 103. However, in FIG. 2, only one photographic lens 103 is illustrated.

A communication terminal 6 of the lens unit 150 is a communication terminal for communication by the lens unit 150 with the digital camera 100. The lens unit 150 communicates with the system control unit 50 via the communication terminal 6 and the communication terminal 10 of the main body 301 of the digital camera 100. Then, the lens system control circuit 4 of the lens unit 150 controls (drives) the diaphragm 102 via the diaphragm drive circuit 2 based on the control of the system control unit 50.

Further, the lens system control circuit 4 of the lens unit 150 performs focusing by moving the photographic lens 103 (performs an AF operation) via the AF drive circuit 3 based on the control of the system control unit 50.

The mirror 12 switches the light beam entered through the photographic lens 103 whether to guide to the eyepiece finder 16 side or an image capturing unit 22 side. The mirror 12 is moved up and down by an actuator (not illustrated) controlled by the system control unit 50.

The mirror 12 is normally located at a position to guide the light beam to the eyepiece finder 16. When an image capturing, a LV display, or a moving image capturing is performed, the mirror 12 is flipped up (mirror-up) to retract from the path of the light beam. When the mirror is up, the light beam entered through the photographic lens 103 is guided to the image capturing unit 22.

The central region of the mirror 12 is configured as a half mirror where apart of the light beam can be transmitted. The mirror 12 allows a part of the light beam to transmit to enter a focus detection unit 11 for detecting focus. By observing the focusing screen 19 through a pentagonal prism 14 and the eyepiece finder 16, a user (photographer) can check the focusing state of an optical image of an object and the picture composition obtained through the lens unit 150.

An AE sensor 17 measures luminance of an object (optical image) passing through the lens unit 150 and outputs the measured luminance of the object to the system control unit 50. The system control unit 50 controls the diaphragm 102 via the lens system control circuit 4 and the diaphragm drive circuit 2, using the luminance of object measured by the AE sensor 17.

The focus detection unit 11 detects a defocus amount and outputs the detected defocus amount to the system control unit 50. The system control unit 50 performs phase difference AF using the detected defocus amount by the focus detection unit 11. More specifically, the system control unit 50 controls the lens system control circuit 4 of the lens unit 150 to move photographic lens 103 via the AF drive circuit 3.

A focal plane shutter is used as a shutter 18 for arbitrarily controlling an exposure time of the image capturing unit 22 (image sensor) by the control of the system control unit 50.

The image capturing unit 22 includes a imaging device configured of a charge-coupled device (CCD) sensor or a complementary metal-oxide semiconductor (CMOS) sensor capable of converting an optical image into an electrical signal. The image capturing unit 22 generates image data (image signal) by converting an optical image of an object formed through the photographic lens 103 into an electric signal.

An A/D conversion unit 23 converts an analog signal into a digital signal. The A/D conversion unit 23 is used for converting image data (image signal) output from the image capturing unit 22 as an analog signal into digital data (digital signal).

An image processing unit 24 performs predetermined resize processing such as a pixel interpolation and a size reduction, and color conversion processing on data (image data converted into digital data) output from the A/D conversion unit 23 or data output from a memory control unit 15. Further, the image processing unit 24 performs predetermined arithmetic processing using the image data.

Then, the system control unit 50 performs exposure control and focusing control, based on the result of the arithmetic processing by the image processing unit 24. Thus, auto-focus (AF) processing of the through the lens (TTL) method, auto-exposure (AE) processing, and flash pre-emission (FP) processing. The image processing unit 24 further performs predetermined arithmetic processing using the image data.

Then, the system control unit 50 also performs TTL auto-white balance (AWB) processing based on the result of the arithmetic processing by the image processing unit 24.

The output data from the A/D conversion unit 23 (image data converted into digital data) is written in the memory 32 via the image processing unit 24 and the memory control unit 15 or directly in the memory 32 via the memory control unit 15.

The memory 32 stores image data generated by the image capturing unit 22 and converted into digital data by the A/D conversion unit 23, and image data to be displayed on the display unit 28. The memory 32 has enough capacity to store a predetermined number of still images and a predetermined time of moving image and sound. In addition, the memory 32 also works as a memory (video memory) for displaying images.

The D/A conversion unit 13 converts the image data for display stored in the memory 32 into an analog signal and outputs it to the display unit 28. The display unit 28 displays the captured image using the image data (analog data) output from the D/A conversion unit 13. That is, the image data for display stored in the memory 32 is displayed on the display unit 28 via the D/A conversion unit 13.

For example, the D/A conversion unit 13 converts the image data converted by the A/D conversion unit 23 into the digital data and stored in the memory 32, into the analog data again to sequentially output it to the display unit 28. Then, the display unit 28 sequentially displays the image data output from the D/A conversion unit 13. In this way, the display unit 28 can function as an electronic view finder to perform the through image display (LV display).

A system timer 53 is a timer unit to measure time used for various controls and time of the internal timer.

A power supply control unit 80 includes a battery detection circuit, a DC/DC converter, and a switch circuit for switching blocks to supply power. The power supply control unit 80 detects attachment of the battery, a type of the battery, and remaining power of the battery. The power supply control unit 80 also controls a power supply unit 30 and the DC/DC converter (not illustrated) to supply required power (voltage) for a required period to each unit including the recording medium 200, based on the detection result and the control of the system control unit 50.

The power supply unit 30 includes a primary battery such as an alkaline battery or a lithium (Li) battery, a secondary battery such as a NiCd battery, or a NiMH battery, and a Li battery, and an AC adapter.

An I/F 31 is an interface for communicating with the recording medium 200 such as a memory card or a hard disk.

The recording medium 200 is a recording medium such as a memory card for recording captured images and configured by a semiconductor memory or a magnetic disk.

The mode dial 60 (mode change switch) is a switch (operation unit) used to input various operation instructions to the system control unit 50. The mode dial 60 is used to switch operation modes of the digital camera 100.

When the mode dial 60 is operated, the system control unit 50 switches, according to the operation of the mode dial 60 by the user, the operation mode of the digital camera 100 to any one of a still image recording mode, a moving image recording mode, and a reproduction mode.

The still image recording mode further includes an automatic image capturing mode, an automatic scene determination mode, a manual mode, an aperture priority mode (Av mode), a shutter speed priority mode (Tv mode), an image capturing scene mode, a program AE mode, and a custom mode.

In the image capturing scene mode, image capturing conditions are set for each image capturing scene. A user can directly select a mode included in the still image capturing mode by operating the mode dial 60.

In addition, after switching to the still image capturing mode by the mode dial 60, the user can switch mode to any mode included in the still image capturing mode using another operation unit. Similarly, the moving image capturing mode may include a plurality of modes.

A menu button 79 is used to display a menu screen (screen for displaying various display items (icons)) for various settings on the display unit 28. That is, when detecting the pressing of the menu button 79, the system control unit 50 displays a menu screen on the display unit 28.

The operation unit 70 is an operation unit (e.g., switches) to input various operation instructions to the system control unit 50. In other words, the operation unit 70 functions as an input unit for receiving an operation of a user. The operation unit 70 includes at least the shutter button 61, the main electronic dial 71, the power switch 72, the sub electronic dial 73, the arrow key 74, the setting button 75, the LV button 75, the enlargement button 77, the reproduction button 78, and the touch panel 205.

Various functions are assigned as appropriate corresponding to the scenes to each operation unit (e.g., switches) of the operation unit 70 by selecting and operating the various display items (icons) included in the menu screen displayed on the display unit 28. Thus, each operation unit can operate as a function button or a function dial.

The function buttons and the function dials includes, for example, an end button, a return button, an image advancing button, a jump button, a diaphragm closing button (preview button), and an attribute change button.

For example, when the menu button 79 is pressed, the menu screen allowing various settings is displayed on the display unit 28. The user can intuitively perform various kinds of settings using the menu screen displayed on the display unit 28, the arrow key 74, the sub electronic dial 73, and the setting button 75.

In FIG. 2, the main electronic dial 71, the sub electronic dial 73, the arrow key 74, the setting button 75, the LV button 76, the enlargement button 77, the reproduction button 78, and the menu button 79 are not illustrated. However, similar to the shutter button 61 and others illustrated therein, the not-illustrated operation units (switches) can send/receive signals to/from the system control unit 50, and can output signals to the system control unit 50 according to the user's operation.

A press button type switch is used as the shutter button 61. The shutter button 61 includes a first shutter switch 62 and a second shutter switch 64. In a state where the shutter button 61 is not operated (pressed), both the first shutter switch 62 and the second shutter switch 64 are off.

When the shutter button 61 is half operated (i.e., half pressed (image capturing preparation instruction)), the first shutter switch 62 becomes ON to generate a first shutter switch signal SW1. The generated first shutter switch signal SW1 is output to the system control unit 50. When the first shutter switch signal SW1 is input, the system control unit 50 starts the AF processing, AE processing, AWB processing, FP processing, and the like.

When the shutter button 61 is completely operated (i.e., fully pressed (image capturing instruction)), the second shutter switch 64 becomes ON to generate a second shutter switch signal SW2.

The generated second shutter switch signal SW2 is output to the system control unit 50. The system control unit 50 starts, when the second shutter switch signal SW2 is input, an operation of a series of image capturing processing from the reading of signals from the image capturing unit 22 to the writing of the image data into the recording medium 200.

The digital camera 100 includes the touch panel 205 (touch detection unit) as one of the operation units 70. The touch panel 205 can detect touch on the display unit 28. The touch panel 205 (touch detection unit) and the display unit 28 are integrally configured.

For example, the touch panel 205 has a light transmission enough not to prevent the display of the display unit 28 (visual recognition by the user), and is provided on the surface of the display screen 281 (i.e., the surface on which images are displayed) of the display unit 28. The input coordinates in the touch panel 205 is associated with the coordinates of the display screen of the display unit 28. Thus, a graphical user interface (GUI) is configured. With the GUI, the user can feel as if the user is directly operating the displayed items on the display unit 28.

However, the type of the touch panel 205 (touch detection unit) is not limited thereto. In the touch panel 205, any of various known type touch panels including a resistive film type, a capacitance type, a surface elastic wave type, an infrared type, an electromagnetic induction type, and an image recognition type, an optical sensor type, can be employed.

The system control unit 50 can detect the following operations to the touch panel 205: touching the touch panel 205 with a finger or a pen (referred to as touch down); in a state of touching the touch panel 205 with a finger or a pen (referred to as touch on); moving a finger or a pen while touching the touch panel 205 (referred to as move); releasing a finger or a pen having touched the touch panel 205 (referred to as touch up); in a state not touching the touch panel 205 (referred to as touch off). The touch panel 205 outputs to the system control unit 50 these operations and the position coordinates on which the finger or the pen is touching.

Then, the system control unit 50 determines which of the operations is performed on the touch panel 205 based on the information output from the touch panel 205. The system control unit 50 can determine the moving direction of the moving finger or the moving pen on the touch panel 205 in the move operation based on the change of the coordinates of the touch position separately in a vertical component and a horizontal component.

When detecting that the touch panel 205 is touched up after touched down via a certain move, the system control unit 50 determines that the user has drawn a stroke on the touch panel 205.

The operation of drawing a stroke quickly is referred to as "flick". The flick is an operation in which a finger in a state of touching the touch panel 205 is moved quickly for a certain distance thereon, and then, the finger is separated therefrom. In other words, the flick is an operation in which the user moves his finger quickly over the touch panel 205.

When the system control unit 50 detects that a move is performed for a predetermined distance or longer in a predetermined speed or faster, the system control unit 50 determines that a flick is performed. Further, when the system control unit 50 detects that a move is performed for a predetermined distance or longer in a lower speed than the predetermined speed, the system control unit 50 determines that a drag is performed. In addition, these operations are sometimes collectively referred to as a "touch operation".

A variable angle state detection unit 201 (position detection unit) detects the relative position of the monitor unit 302 relative to the main body 301 (hereinbelow, sometimes referred to simply as the position of the monitor unit 302).

The variable angle state detection unit 201 (position detection unit) is configured of, for example, a switch that turns ON when the monitor unit 302 has moved to a predetermined position. Alternatively, the variable angle state detection unit 201 (position detection unit) is configured of two angle sensors. One angle sensor detects a rotation angle of the monitor unit 302 when it is rotated around a first rotation shaft L1. Another angle sensor detects a rotation angle of the monitor unit 302 when it is rotated around a second rotation shaft L2.

The detection result of the variable angle state detection unit 201 (position detection unit) is output to the system control unit 50.

Here, referring to FIGS. 3A and 3B and FIGS. 4A and 4B, a position of the monitor unit 302 (relative position of the monitor unit 302 with respect to the main body 301) which can be detected by the variable angle state detection unit 201 (position detection unit), will be described.

For convenience of description, the left, right, up, and down directions of the main body 301 of the digital camera 100, the monitor unit 302, the display unit 28, and the display screen 281 of the display unit 28 are set as the directions indicated by arrows illustrated in FIGS. 3A and 3B and FIGS. 4A and 4B as left, right, up, and down directions being the reference. The orientation of the digital camera 100 illustrated in FIGS. 3A and 3B, and FIGS. 4A and 4B is defined as a "normal orientation".

The monitor unit 302 can rotate in a rotation direction around the first rotation shaft L1 and in a rotation direction around the second rotation shaft L2 different from the first rotation shaft L1, with respect to the main body 301 of the digital camera 100 with the hinge portion 101 (connection portion).

The first rotation shaft L1 is a rotation shaft positioned in the hinge portion 101 (i.e., passing through the hinge portion 101), and parallel thereto in the up-down direction. The monitor unit 302 rotates around the first rotation shaft L1 (in the lateral direction) to open and close with respect to the main body 301 (movable in the open and close directions).

The second rotation shaft L2 is positioned at the middle portion in the up-down direction between the monitor unit 302 and the hinge portion 101, and is a rotation shaft vertical to the first rotation shaft L1. The monitor unit 302 rotates around the second rotation shaft L2 in the up-down direction, to move between a position at which the display screen 281 of the display unit 28 looks to the front side (object side) and a position at which the display screen 281 of the display unit 28 looks to the back side (user (i.e., photographer) side).

Figure 3A:
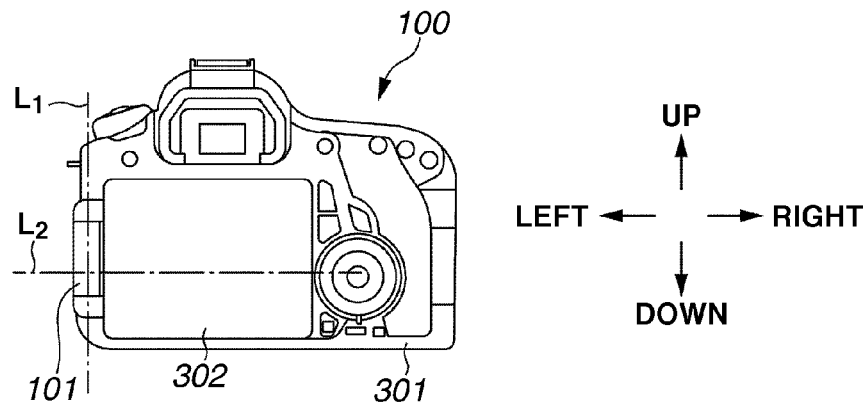
FIG. 3A is an external view illustrating a positional relationship between a main body and a monitor unit when the monitor unit is in a state of "close position".

FIG. 3A is an external view illustrating a positional relationship between the main body 301 and the monitor unit 302 when the monitor unit 302 is at the "close position". In a state illustrated in FIG. 3A, the display screen 281 of the display unit 28 provided in the monitor unit 302 is housed in an orientation facing to the back side of the main body 301 (folded). In this state, the display screen 281 of the display unit 28 is not exposed to the outside. The position of the monitor unit 302 is defined as the "close position".

Figure 3B:
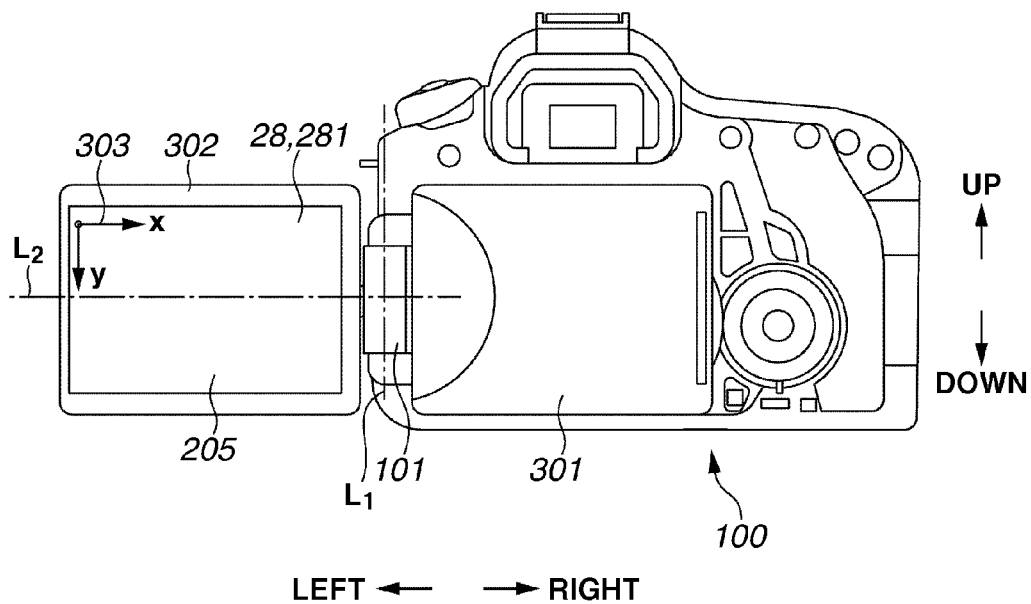
FIG. 3B is an external view illustrating a positional relationship between the main body and the monitor unit when the monitor unit is in a state of "open position" (first position).

FIG. 3B is an external view illustrating a relationship between the main body 301 and the monitor unit 302 when the monitor unit 302 is positioned at an "open position" (first position).

In a state illustrated in FIG. 3B, the monitor unit 302 is at a position separated from back side of the main body 301 of the digital camera 100. The display screen 281 of the display unit 28 provided in the monitor unit 302 is opened to look to the same side as the back side of the digital camera 100 (i.e., photographer side). This position of the monitor unit 302 (first position) is defined as an "open position".

For description, a coordinate system 303 is illustrated in FIG. 3B in which the upper left portion of the display screen 281 of the display unit 28 in the "open position" as an origin thereof, though the coordinate system 303 is not actually displayed. In addition, the horizontal direction from left (far side from the main body 301) to right (close side to the main body 301) is defined as an X direction, and the vertical direction from up to down is defined as a Y direction. The user can move the monitor unit 302 from the "close position" to the "open position" by rotating the monitor unit 302 around the first rotation shaft L1.

Figure 4A:
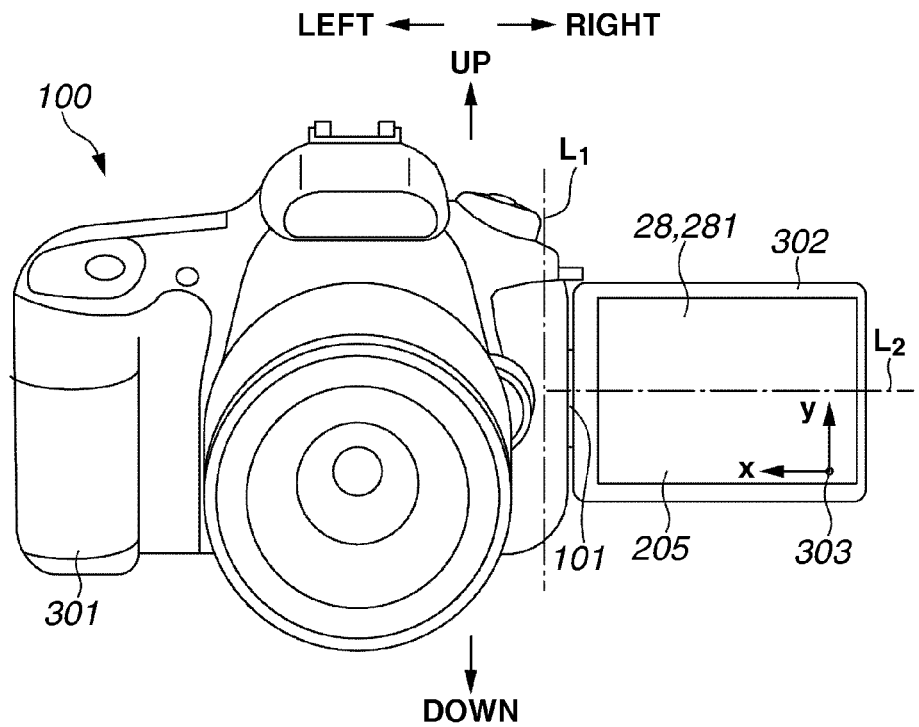
FIG. 4A is an external view illustrating a positional relationship between the main body and the monitor unit when the monitor unit is in a state of "reversal open position" (second position).

FIG. 4A is an external view illustrating a positional relationship between the main body 301 and the monitor unit 302 at the "reversal open position" (second position). In a state illustrated in FIG. 4A, the display screen 281 of the display unit 28 provided in the monitor unit 302 is opened to look to the same side of the front side of the digital camera 100 (i.e., object side). For convenience of description, this position (second position) of the monitor unit 302 is defined as "reversal open position".

The user can move the monitor unit 302 from the "open position" (refer to FIG. 3B) to the "reversal open position" by rotating the monitor unit 302 around the second rotation shaft L2.

As illustrated in FIG. 3B, seen from the back side of the digital camera 100 in a state where the monitor unit 302 is at the "open position", the coordinate system 303 is positioned at upper left of the display screen 281 of the display unit 28.

On the other hand, as illustrated in FIG. 4A, seen from the front side of the digital camera 100 in a state where the monitor unit 302 is at the "reversal open position", the coordinate system 303 is positioned at lower right of the display screen 281 of the display unit 28. In this way, the positions of the coordinate system 303 are viewed reversely in right and left, and up and down between the "open position" and the "reversal open position".

Therefore, the system control unit 50 reverses the display directions of the various display items displayed on the display unit 28 in right and left, and up and down, when the system control unit 50 detects, based on the detection result of the variable angle state detection unit 201, that the monitor unit 302 has moved from the "open position" to the "reversal open position".

In this way, it is possible to keep the direction of the image seen from the user. However, when the display unit 28 displays the through-image, the system control unit 50 displays a mirror image in which up and down directions of the through-image are reversed.

Figure 4B:
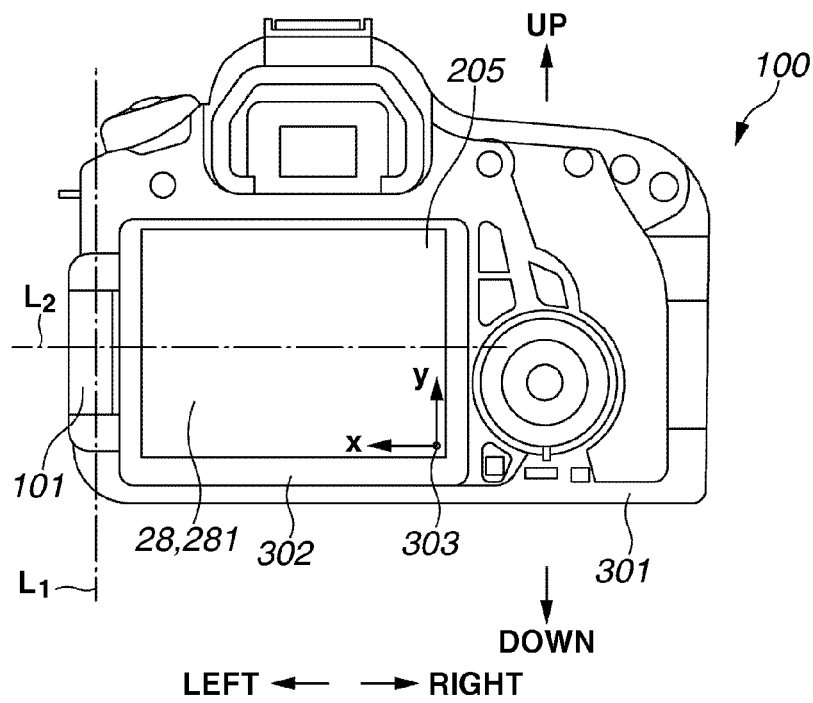
FIG. 4B is an external view illustrating a positional relationship between the main body and the monitor unit when the monitor unit is in a state of "reversal close position".

FIG. 4B is an external view illustrating a positional relationship between the main body 301 and the monitor unit 302 in a state where the monitor unit 302 is at the "reversal close position". In a state illustrated in FIG. 4B, though the monitor unit 302 is closed (folded) with respect to the main body 301, the display screen 281 of the display unit 28 looks to the same direction as the back side of the digital camera 100 (photographer side) to be exposed.

The position of the monitor unit 302 is referred to as "reversal close position". The user can rotate the monitor unit 302 at the "reversal open position" (refer to FIG. 4A) around the first rotation shaft L1 to move the monitor unit 302 to the "reversal close position" (refer to FIG. 4B).

As illustrated in FIG. 4A, seen from the front side of the digital camera 100 in a state where the monitor unit 302 is at the "reversal open position", the coordinate system 303 is positioned at lower right of the display screen 281 of the display unit 28. As illustrated in FIG. 4B, seen from the back side of the digital camera 100 in a state where the monitor unit 302 is at the "reversal close position", the coordinate system 303 is positioned at lower right of the display screen 281 of the display unit 28.

In this way, the coordinate system 303 is positioned at lower right of the display screen 281 of the display unit 28 in both states where the monitor unit 302 is at the "reversal open position" and at the "reversal close position", and the position of the coordinate system 303 is not changed. Therefore, normally, the system control unit 50 does not change the display direction of the various display items between the "reversal open position" and the "reversal close position".

However, the system control unit 50 displays a normal image (i.e., not mirror image) when the monitor unit 302 is moved to the "reversal close position" in a case where the system control unit 50 displays the mirror image of the through-image at the "reversal open position".

Figure 5A:
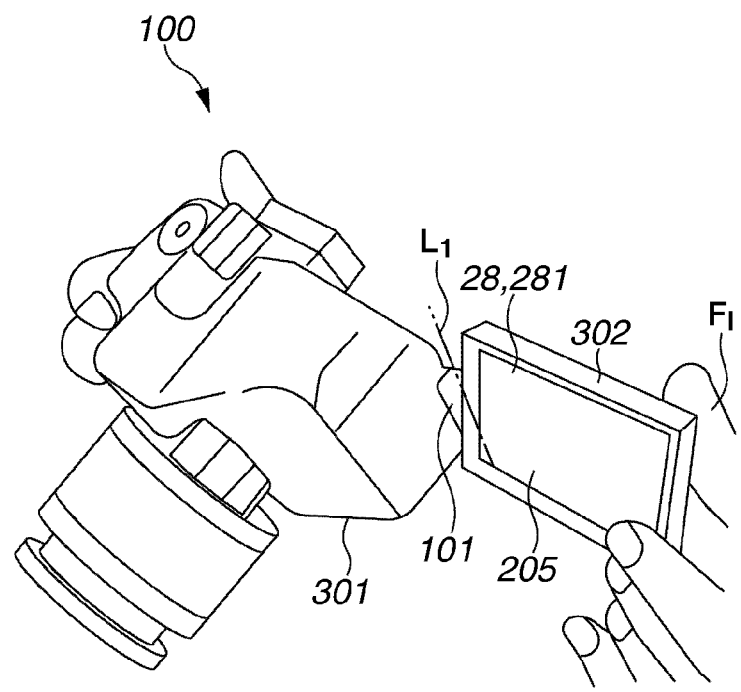
FIG. 5A is a schematic diagram illustrating an operation of rotating (moving) the monitor unit between the "open position" (first position) and the "reversal open position" (second position) by a user.

FIG. 5A is a schematic diagram illustrating an operation of rotating (moving) the monitor unit 302 between the "open position" (first position) and the "reversal open position" (second position) by the user.

As illustrated in FIG. 5A, in this case, the user often grips the vicinity of the far end portion positioned farther from the hinge portion 101 (first rotation shaft L1) in the portions of the monitor unit 302 to rotate thereof, so as to increase the moment applied to the monitor unit 302. In this case, as illustrated in FIG. 5A, a finger FI of a hand gripping the monitor unit 302 may touch the display unit 28 (touch panel 205) unintentionally.

Thus, when the user rotates (moves) the monitor unit 302 between the "open position" (first position) and the "reversal open position" (second position), the user's finger FI may touch the far end portion of the display unit 28 positioned farther from the hinge portion 101 (first rotation shaft L1) more often.

Figure 5B:
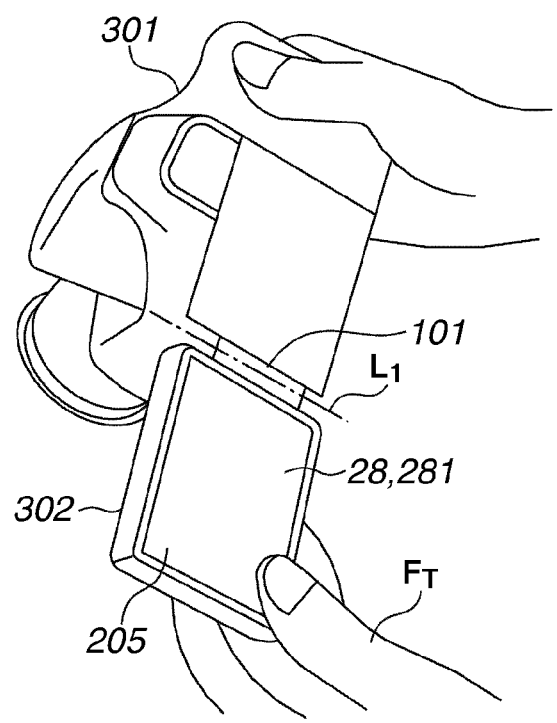
FIG. 5B is a schematic diagram illustrating an operation of rotating (moving) the monitor unit between the "open position" and the "close position" by a user.

FIG. 5B is a schematic diagram illustrating an operation of rotating (moving) the monitor unit 302 between the "open position" and the "close position" by the user.

As illustrated in FIG. 5B, in this case, the user often grips the vicinity of the far end positioned farther from the hinge portion 101 (first rotation shaft L1) in the portions of the monitor unit 302 to rotate thereof, so as to increase the moment applied to the monitor unit 302. In this case, as illustrated in FIG. 5B, the user may unintentionally touch the display unit 28 (touch panel 205) with a finger FT of a hand gripping the monitor unit 302.

Thus, when the user rotates (moves) the monitor unit 302 between the "open position" (first position) and the "close position", the user's finger FT may touch the far end portion of the display unit 28 positioned farther from the hinge portion 101 (first rotation shaft L1) more often.

Therefore, in the present exemplary embodiment, the system control unit 50 does not display the display items allowing touch operation at positions where the user may easily touch unintentionally when the monitor unit 302 is rotated. Thus, with such a configuration, an erroneous operation caused by an unintentional touch can be prevented.

Figure 6A:
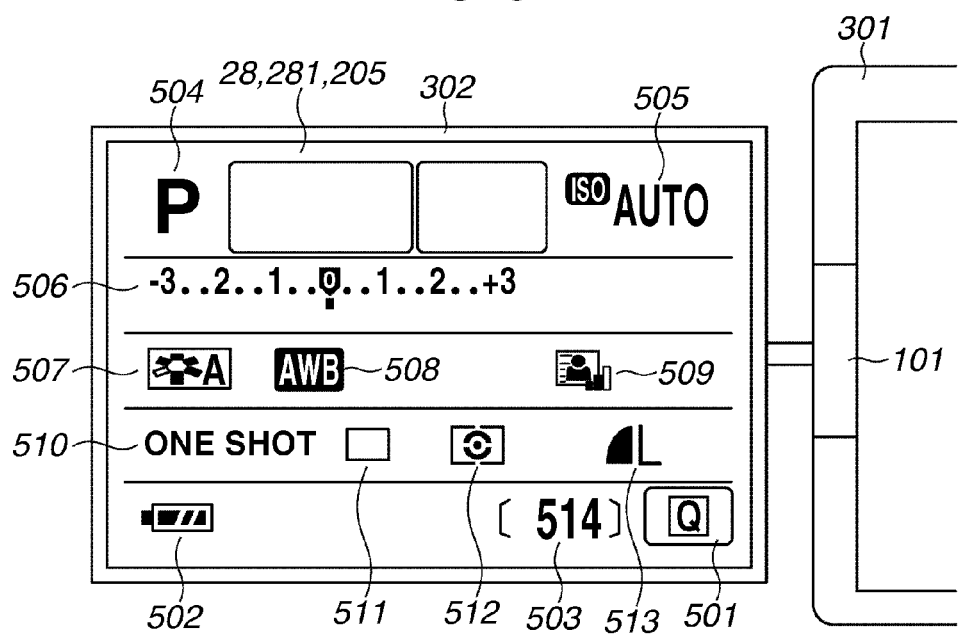
FIGS. 6A and 6B are diagrams each illustrating a display example of display items allowing touch operation and other display items for each position of the main body.
Figure 6B:
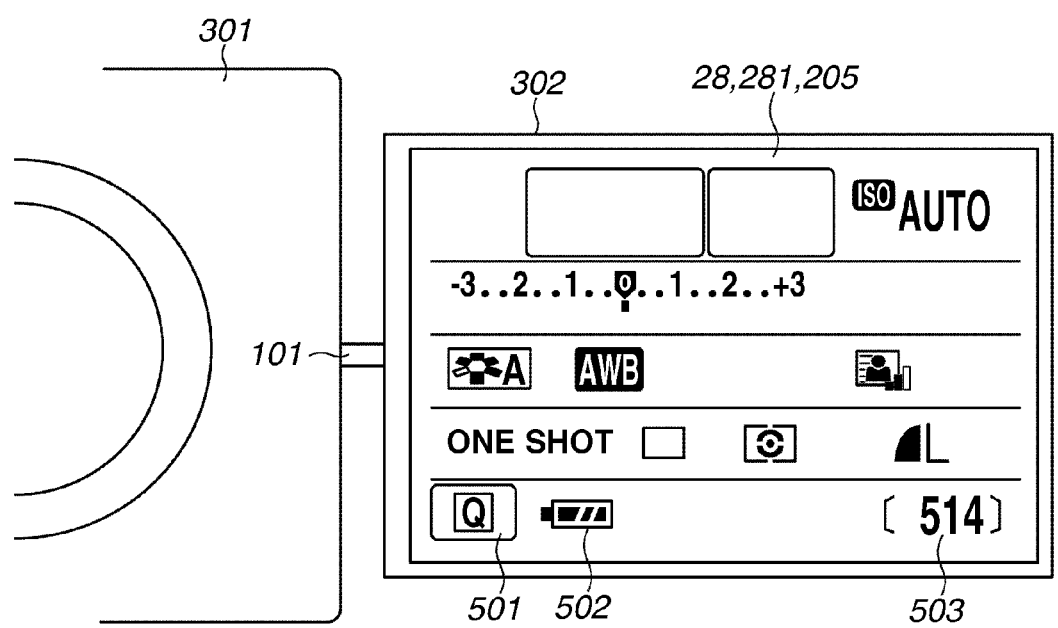

FIGS. 6A and 6B are display examples each illustrating display items allowing touch operation and other items at each position of the main body 301.

FIG. 6A is a diagram illustrating a display example of the display unit 28 in a state where the monitor unit 302 is at the "open position" and in the "locked state". The arrangement of the display items illustrated in FIG. 6A is referred to as a layout pattern A1.

In the "locked state", touch operation on the display items other than a Q button 501 (first display item) as a lock release button (area other than the area where the Q button 501 is displayed) is not accepted. The Q button 501 (first display item) is a display item allowing touch operation.

The Q button 501 (first display item) accepts an instruction for changing an ineffective state where a touch operation on the area other than the area where the Q button 501 is displayed (other display items other than the Q button 501) is impossible (locked state) to an effective state (lock released state).

In other words, the system control unit 50 changes, when detecting that the area where the Q button 501 is displayed is touched, the ineffective state where it is impossible to accept the touch operation on the area other than the area where the Q button 501 is displayed (locked state) to the effective state where it is possible (lock released). The state where the touch operation is possible is referred to as a "lock released state".

Hereinbelow, in the following description, "the area where the Q button 501 is displayed has received a touch operation is detected" is simply expressed as "a touch operation on the Q button 501 is detected". Other display items are similarly expressed. In addition, display items other than the Q button 501 are sometimes simply expressed as "other display items".

In the locked state illustrated in FIG. 6A, only the Q button 501 (first display item) is a display item allowing touch operation (accept touch down). In the locked state, other display items are just for displaying information.

In other words, the system control unit 50 does not perform processing, even if the touch operation on any one of other display items is detected, corresponding thereto.

When the system control unit 50 detects a touch operation (touch down) to the Q button 501, the system control unit 50 releases lock to enable other display items. Then, when the system control unit 50 detects a touch operation on other items in a lock released state, various processing corresponding to any one of other display items that has received a touch operation.

In the example illustrated in FIG. 6A, the system control unit 50 (control unit) disposes (displays) the Q button 501, which is the display item allowing touch operation, on the near side to the hinge portion 101, and disposes (displays) other display items, which cannot receive a touch operation, at a position farther from the hinge portion 101.

In this way, even if the user grips the monitor unit 302 to rotate thereof and touches it with the user's finger unintentionally, no display items allowing touch operation are not displayed (disposed) at the position. Therefore, an erroneous operation to be performed by the user can be prevented, and the digital camera 100 is prevented from performing processing that is not intended by the user.

FIG. 6B illustrates a display example in the locked state of the display unit 28 at the "reversal open position" (second position). The arrangement in FIG. 6B is referred to as a layout pattern B1. As described above, the system control unit 50 (control unit) displays each display item in an arrangement in which right and left, up and down are reversed when the monitor unit 302 is moved from the "open position" to the "reversal open position".

In this way, the display positions of the display items seen from the user side are not changed. However, the system control unit 50 changes the position of the Q button 501 (first display item), which is a display item allowing touch operation, seen from the user side. In other words, the system control unit 50 (control unit) changes the position of the Q button 501, which is displayed at lower right seen from the user when the monitor unit 302 is at the "open position", to lower left at the "reversal open position".

This change is performed to dispose the Q button 501, which is a display item allowing touch operation, to the vicinity of the hinge portion 101, and the display items (second display items), which are display items not allowing touch operation, to the side farther from the hinge portion 101.

In this way, even though the user unintentionally touches the display unit 28 (touch panel 205) when the user grips the monitor unit 302 to rotate, no display items allowing touch operation are not displayed at a position touched by the user. In this way, an unintentional operation (processing) caused by the unintentional touch by the user is prevented from being performed.

As illustrated in FIGS. 6A and 6B, the system control unit 50 displays the Q button 501 (first display item), a battery remaining power display 502 (second display item), and a remaining photographable number display 503 (second display item) on the display unit 28 side by side in the horizontal direction. The system control unit 50 (control unit) shifts the position of each item, as a result of the position change of the Q button 501, to the right by one item without changing the relative relationship between the battery remaining power display 502 and the remaining photographable number display 503.

The battery remaining power display 502 and the remaining photographable number display 503 (second display items) display the state of the digital camera 100, and not the setting contents that can be changed by the user's touch operation.

Therefore, even after the system control unit 50 detects an touch operation (touch down) to the Q button 501 and releases lock, the touch operation of the battery remaining power display 502 and the remaining photographable number display 503 do not become possible. In other words, since either of the battery remaining power display 502 or the remaining photographable number display 503 is not an operation target, even if the display positions are changed between the "open position" and the "reversal open position", it would not cause an erroneous operation by the user.

On the other hand, the display items other than the battery remaining power display 502 and the remaining photographable number display 503 (display items other than the second display items) become icons allowing touch operation when the Q button 501 receives a touch operation (touch down). Therefore, if the display position seen from the user is changed between the "open position" and the "reversal open position", an erroneous operation may be caused.

To solve this problem, the system control unit 50 disposes the display items (display items other than the second display items), which become icons allowing touch operation when becoming effective, at the same positions seen from the user. In other words, display items whose positions are changed and display items whose positions are not changed seen from the user between the layout pattern A1 and the layout pattern B1 are determined based on whether they have possibilities to be operated as touch icons as described above.

On the other hand, the system control unit 50 (control unit) does not change the layout of the display items that are not affected by the position change of the Q button 501. Therefore, the system control unit 50 does not change the layout of the following display items seen by the user between the layout pattern A1 and the layout pattern B1. However, the system control unit 50 performs reversal processing in right and left, and up and down, to display the layout seen from the user in the same way.

Figure 7A:
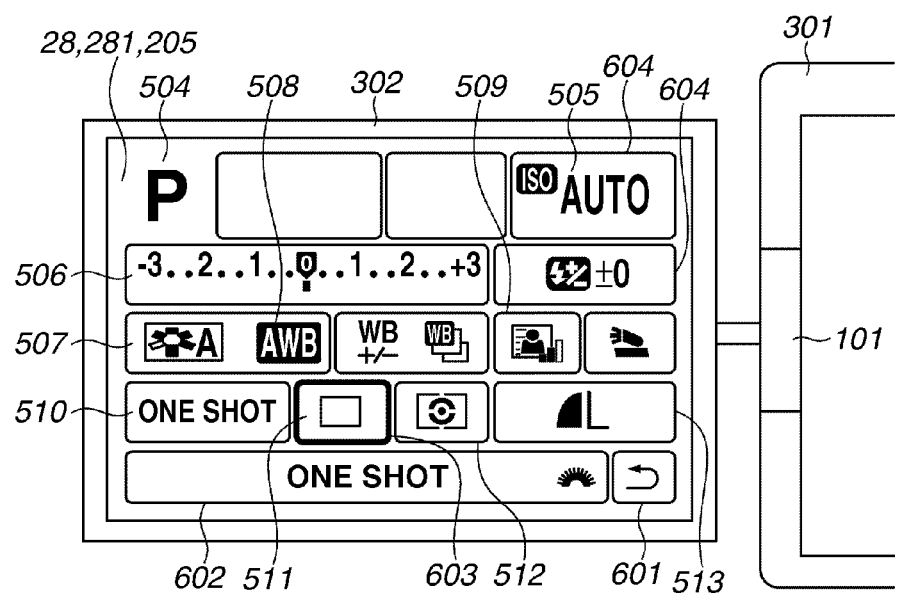
FIGS. 7A and 7B are examples each illustrating a display example in a case where a locked state is released in response to a touch operation of a Q button so that each display item changes to a touch button allowing touch operation.
Figure 7B:
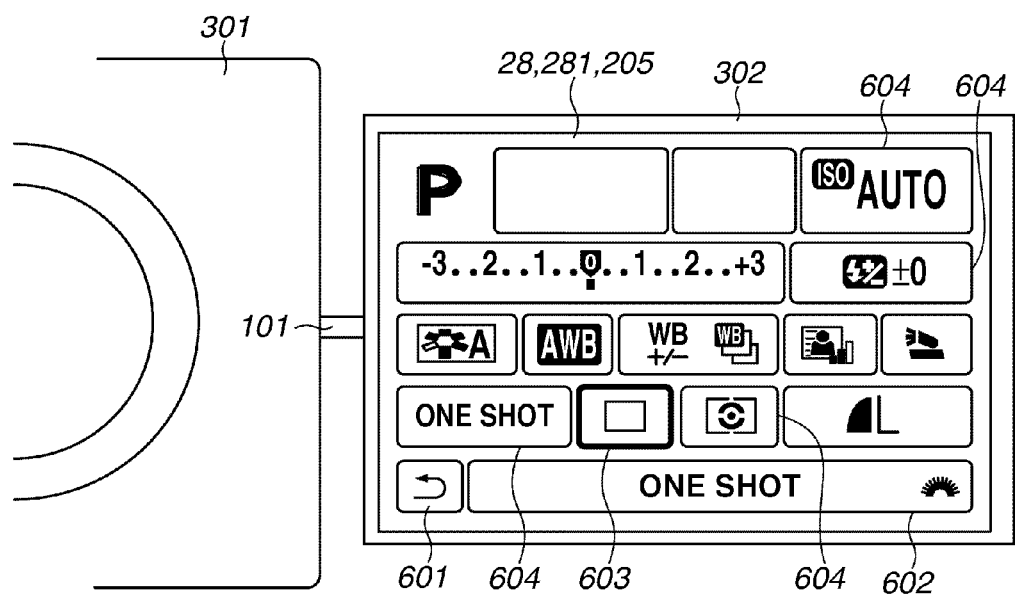

Next, referring to FIGS. 6A and 6B and FIGS. 7A and 7B, the display of the display unit 28 in a case where the locked state shifts to the lock released state, is described. FIGS. 7A and 7B are display examples illustrating a case where the display unit 28 has become the lock released state in response to the touch operation on the Q button 501, and each display item has become the touch icon allowing touch operation.

FIG. 7A is a display example illustrating a case where the display illustrated in FIG. 6A shifts to the lock released state. The display illustrated in FIG. 7A is referred to as a layout pattern A2. Further, FIG. 7B is a display example illustrating a case where the display illustrated in FIG. 6B shifts to the lock released state. The display illustrated in FIG. 7B is referred to as a layout pattern B2.

Of the other display items, there are following display items which can change to icons allowing touch operation when shifting to the lock released state.

- an ISO icon 505 indicating currently set ISO sensitivity
  Examples in FIGS. 6A and 6B and FIGS. 7A and 7B illustrate that ISO AUTO for setting ISO sensitivity automatically is set.
- an exposure correction/ auto exposure bracketing (AEB) setting display 506 indicating a currently set exposure correction value and a correction value used for the auto exposure bracketing (AEB).
- a picture style icon 507 indicating a currently set color processing characteristics.
- a WB icon 508 indicating a currently set white balance setting.

a lighting icon 509 indicating a mode for correcting currently set brightness and contrast.

an AF mode icon 510 indicating a currently set AF mode. Examples illustrated in FIGS. 6A and 6B and FIGS. 7A and 7B indicate that "one shot" mode is selected. The "one shot" mode is suitable for capturing a still object.

a drive icon 511 indicating a currently set drive mode among a single shooting, a continuous shooting, a remote control shooting, and a self-timer shooting.

a light metering mode icon 512 indicating a currently set light metering mode.

a recording image quality icon 513 indicating currently set recording quality (compression ratio and number of recording pixels).

In a case where the monitor unit 302 is at the "open position" and in the locked state, as illustrated in FIG. 6A, the display unit 28 displays the layout pattern A1. When the system control unit 50 (control unit) detects a touch operation on the Q button 501 in this state, the system control unit 50 shifts the display unit 28 to the lock released state, and changes the display of the display unit 28 to the layout pattern A2 illustrated in FIG. 7A.

When the monitor unit 302 is at a position other than the "open position" to shift to the lock released state, and thereafter, the monitor unit 302 is moved to the "open position", the display unit 28 also displays the layout pattern A2 illustrated in FIG. 7B.

As illustrated in FIGS. 6A and 7A, the system control unit 50 (control unit) displays a return button 601 (third display item) in the lock released state at a position where the Q button 501 was displayed in the locked state. The return button 601 (third display item) is a touch icon allowing touch operation. When the system control unit 50 detects a touch operation (touch down) on the return button 601 (third display item), the system control unit 50 shifts the display unit 28 from the lock released state to the locked state. In other words, the system control unit 50 returns the display of the display unit 28 to the layout pattern A1 illustrated in FIG. 6A, and shifts the display of the display unit 28 to a state where the touch operation on other display items is not allowed.

Further, as illustrated in FIGS. 6A and 7A, the system control unit 50 displays a guidance 602 in the lock released state at a position where the battery remaining power display 502 and the remaining photographable number display 503 were displayed in the locked state.

The guidance 602 displays setting contents about a display item framed with a selection frame 603 and an operation method for changing the setting. In the illustrated example, concerning the drive icon 511 framed with the selection frame 603, the guidance 602 indicates that currently the drive mode is set to the "single shooting", and it can be changed by the operation of the main electronic dial 71.

The display items 505 to 513 are display items on which touch operation is not allowed before the touch operation (touch down) on the Q button 501 is detected. Then, when the system control unit 50 detects the touch operation on the Q button 501 to shift to the lock released state, these display items 505 to 513 are changed to touch icons allowing touch operation.

Then, the system control unit 50 displays a frame 604 indicating an area allowing touch operation for each item to indicate that these display items 505 to 513 are icons allowing touch operation in the lock released state.

The user can move the selection frame 603 to a touched display item by performing touch operation (touch down) on each of the display items 505 to 513 which is not framed with the selection frame 603 (i.e., inside the area framed with the frame 604).

Further, the user can move the selection frame 603 to a targeted display item by operating the sub electronic dial 73. More specifically, when the system control unit 50 detects a touch operation (touch down) on any of the other display items 505 to 513 in a state where the display unit 28 performs display as illustrated in FIG. 7A, the system control unit 50 moves the selection frame 603 to any one of the display items 505 to 513 on which the touch operation is detected.

Further, when the system control unit 50 detects a rotation operation of the sub electronic dial 73 in a state where the display unit 28 performs display as illustrated in FIG. 7A, the system control unit 50 moves the selection frame 603 according to the rotation of the sub electronic dial 73.

Then, the user can change the setting content concerning any one of the display items 505 to 513, which is subjected to the touch operation, by performing touch operation on the framed display item of the display items 505 to 513 with the selection frame 603.

In other words, when the system control unit 50 detects the touch operation on any one of the display items 505 to 513 framed with the selection frame 603, the system control unit 50 performs processing for changing the setting content concerning any one of the display items 505 to 513 of which the touch operation is detected.

The setting content may be changed according to the number of touch operations on any one of the display items 505 to 513. Alternatively, a sub screen dedicated for the setting change of the corresponding setting item is opened to change the setting content according to the operation on the sub screen. The setting items of the display items 505 to 513 framed with the selection frame 603 can be changed according to the operation of the switches such as the main electronic dial 71.

When the monitor unit 302 is at the "reversal open position" (second position) and in the locked state, as illustrated in FIG. 6B, the display unit 28 displays the layout pattern B1. When the system control unit 50 (control unit) detects a touch operation on the Q button 501 in this state, the system control unit 50 shifts the display unit 28 to the lock released state, and changes (updates) the display of the display unit 28 to the layout pattern B2 illustrated in FIG. 7B.

When the monitor unit 302 is at a position other than the "reversal open position" to shift to the lock released state, and thereafter, the monitor unit 302 is moved to the "reversal open position", the display unit 28 also displays the layout pattern B2 illustrated in FIG. 7B (updates display).

As illustrated in FIGS. 7A and 7B, the layout pattern B2 has the same positional relationship with the layout pattern A2 except that the positions of the return button 601 and the guidance 602 are replaced with each other in the right and left seen from the user. However, the system control unit 50 performs right and left, up and down reversal processing to keep the positional relationship of the display items seen from the user unchanged.

In the layout pattern B2, the system control unit 50 displays the return button 601 at a position where the Q button 501 was displayed in the layout pattern B1 (refer to FIG. 6B). Further, in the layout pattern B2, the system control unit 50 displays the guidance 602 at a position where the battery remaining power display 502 and the remaining photographable number display 503 were displayed in the layout pattern B1 (refer to FIG. 6B).

Next, processing (control method according to the present exemplary embodiment) for performing the operation described above will be described. FIG. 8 (8A and 8B) is a flowchart illustrating processing to realize operation of the processing (control method according to the present exemplary embodiment) to perform the above processing. This processing is realized by the system control unit 50 loading a program stored in the nonvolatile memory 56 in the system memory 52 and executing the program.

The system control unit 50 starts the processing in FIG. 8 when the digital camera 100 is set to the image capturing mode in a state of other than the LV mode.

In step S801, the system control unit 50 determines whether the monitor unit 302 is at the "close position" based on the detection result of the positional relationship between the main body 301 and the monitor unit 302 detected by the variable angle state detection unit 201. If it is determined that the monitor unit 302 is at the "close position" (YES in step S801), the processing proceeds to step S802. Otherwise (NO in step S801), the processing proceeds to step S810.

In step S802, the system control unit 50 turns off the display of the display unit 28 (stop displaying). Then, the processing proceeds to step S803.

In step S803, the system control unit 50 determines whether an instruction by the user to capture an image is received. Specifically, if the system control unit 50 receives the second shutter switch signal SW2 from the second shutter switch 64, the system control unit 50 determines that an instruction by the user to capture an image is received. Then, if the system control unit 50 determines that the image capturing operation is received (YES in step S803), the processing proceeds to step S804. Otherwise (NO in step S803), the processing proceeds to step S805.

In step S804, the system control unit 50 performs a series of image capturing processing from capturing an image to converting it into image data (image file) and recording it in the recording medium 200.

In step S805, the system control unit 50 determines whether an operation other than the operations of the shutter button 61 and rotating the monitor unit 302 (other operations) is performed. If it is determined that one of other operations is performed (YES in step S805), the processing proceeds to step S806. Otherwise (NO in step S805), the processing proceeds to step S807. In step S806, the system control unit 50 performs processing corresponding to the other operation. The processing corresponding to the other operations includes, for example, the change of image capturing mode according to the operation of the mode dial 60.

In step S807, the system control unit 50 determines whether the relative position between the main body 301 and the monitor unit 302 is changed, based on the detection result of the variable angle state detection unit 201. In other words, it is determined whether the monitor unit 302 is rotated. If it is determined that the relative position therebetween is changed (YES in step S807), the processing proceeds to step S801. On the other hand, if it is determined that the relative position therebetween is not changed (NO in step S807), the processing proceeds to step S808.

In step S808, the system control unit 50 determines whether an end operation is performed. The end operation includes operations for turning off the power source, shifting to the reproduction mode, and shifting to the LV mode. If it is determined that the end operation is performed (YES in step S808), the system control unit 50 ends the image capturing mode processing. Otherwise (NO in step S808), the processing returns to step S803 to repeat the processing.

On the other hand, in step S810, the system control unit 50 determines whether the monitor unit 302 is at the "open position", based on the positional relationship between the main body 301 and the monitor unit 302 detected by the variable angle state detection unit 201. If it is determined that the monitor unit 302 is at the "open position" (YES in step S810), the processing proceeds to step S811. Otherwise (NO in step S810), the processing proceeds to step S812. In addition, it is determined that the monitor unit 302 is not at the "close position" (NO in step S801) before step S810. Therefore, in step S810, if it is determined that the monitor unit 302 is not at the "open position" (NO in step S810), the monitor unit 302 is at the "reversal open position" or the "reversal close position".

In step S811, the system control unit 50 displays information of the Q button 501 and various display items on the display unit 28 in the layout pattern A1. The display example at this time is as described above referring to FIG. 6A.

In step S812, the system control unit 50 displays information of the Q button 501 and various display items on the display unit 28 in the layout pattern B1. The display example at this time is as described above referring to FIG. 6B.

In addition, the system control unit 50 displays, in the layout pattern B1, right and left, up and down of each display item reversed with respect to the layout pattern A1 to keep the directions of the texts and icons seen from the user correct.

In step S813, the system control unit 50 determines whether a touch operation (touch down) on the Q button 501 is performed. If it is determined that the touch operation (touch down) on the Q button 501 is performed (YES in step S813), the processing proceeds to step S820. Otherwise (NO in step S813), the processing proceeds to step S814.

The processing from step S814 to step S818 is similar to that from step S803 to step S807 described above. Therefore, the description thereof is omitted.

In step S819, the system control unit 50 determines whether an end operation is performed. If it is determined that the end operation is performed (YES in step S819), the image capturing mode processing is ended. Otherwise (NO in step S819), the processing returns to step S813 to repeat the processing.

In step S813, if the touch operation (touch down) on the Q button 501 is detected (YES in step S813), the processing proceeds to step S820. In step S820, the system control unit 50 performs processing corresponding to the touch operation (touch down) on the Q button 501.

Specifically, the system control unit 50 (1) replaces the Q button 501 with the return button 601, (2) activates each display item that can be changed into the item allowing touch operation (change into the touch icon allowing touch operation), and (3) displays frame 604 for indicating an area allowing touch operation.

As described above, when the system control unit 50 detects a touch operation on the Q button 501 when the monitor unit 302 is at the "open position", the system control unit 50 updates the display on the display unit 28 from the layout pattern A1 (FIG. 6A) to the layout pattern A2 (FIG. 7A).

Further, when the system control unit 50 detects a touch operation on the Q button 501 when the monitor unit 302 is at the "reversal open position" or the "reversal close position", the system control unit 50 updates the display on the display unit 28 from the layout pattern B1 (FIG. 6B) to the layout pattern B2 (FIG. 7B).

In other words, the system control unit 50 changes (updates) the display on the display unit 28 according to whether the display of the display unit 28 was the layout pattern A1 or the layout pattern B1 before detecting the touch operation on the Q button 501.

In step S821, the system control unit 50 determines whether a touch operation is performed on any one of the display items 505 to 513 that are changed into touch icons. If it is determined that the touch operation on any one of the display items changed into touch icons (YES in step S821), the processing proceeds to step S822. Otherwise (NO in step S821), the processing proceeds to step S823.

In step S822, the system control unit 50 performs processing corresponding to the display item subjected to the touch operation and the content of the touch operation.

More specifically, for example, when the system control unit 50 detects that a touch down is performed on a display item on which the selection frame 603 is not placed, the system control unit 50 places the selection frame 603 thereon. Further, when the system control unit 50 detects a touch down operation on a display item on which the selection frame 603 is placed, the system control unit 50 performs processing for changing the setting content about the display item on which the touch down operation is detected.

The processing of step S823 and step S824 is similar to that of step S803 and step S804 described above. Therefore, the description thereof is omitted.

In step S825, the system control unit 50 determines whether a touch operation (touch down) is performed on the return button 601. When it is determined that an operation (touch down) on the return button 601 is performed (YES in step S825), the processing proceeds to step S826. Otherwise (NO in step S825), the processing proceeds to step S827.

In step S826, the system control unit 50 updates the display corresponding to the touch operation of the return button 601. Specifically, the system control unit 50 (1) replaces the return button 601 with the Q button 501, (2) disables other display items (touch icons allowing touch operation), (3) deletes the frame 604.

In other words, the system control unit 50 changes, in a case where the display of the display unit 28 is the layout pattern A2 (refer to FIG. 7A), the display of the display unit 28 to the layout pattern A1 (refer to FIG. 6A).

On the other hand, the system control unit 50 changes, in a case where the display of the display unit 28 is the layout pattern B2 (refer to FIG. 7B), the display of the display unit 28 to the layout pattern B1 (refer to FIG. 6B). When the processing of step S826 is finished, the processing proceeds to step S813.

The processing performed in step S827 and step S828 is similar to that of step S805 and step S806 described above. Therefore, the description thereof is omitted.

In step S829, the system control unit 50 determines whether the relative position between the main body 301 and the monitor unit 302 is changed, based on the detection result of the variable angle state detection unit 201. In other words, the system control unit 50 determines whether an operation to rotate the monitor unit 302 is performed. If it is determined that the relative position therebetween is changed (YES in step S829), the processing proceeds to step S830. On the other hand, if it is determined that the relative position therebetween is not changed (NO in step S829), the processing proceeds to step S835.

In step S830, the system control unit 50 determines whether the monitor unit 302 is at the "close position" based on the detection result of the positional relationship between the main body 301 and the monitor unit 302 detected by the variable angle state detection unit 201. If the system control unit 50 determines that the monitor unit 302 is at the "close position" (YES in step S830), the processing proceeds to step S831. Otherwise (NO in step S830), the processing proceeds to step S832.

In step S831, the system control unit 50 turns OFF the display of the display unit 28. Then, the processing proceeds to step S835.

In step S832, the system control unit 50 determines whether the monitor unit 302 is at the "open position" based on the detection result of the positional relationship between the main body 301 and the monitor unit 302 detected by the variable angle state detection unit 201. If it is determined that the monitor unit 302 is at the "open position" (YES in step S832), the processing proceeds to step S833. Otherwise (NO in step S321), the processing proceeds to step S834.

In step S833, the system control unit 50 changes (updates) the display of the display unit 28 to the layout pattern A2 (refer to FIG. 7A). Then, the processing proceeds to step S835.

The processing proceeds to step S834 when the monitor unit 302 is at the "reversal open position" or the "reversal close position". Therefore, in step S834, the system control unit 50 changes (updates) the display of the display unit 28 to the layout pattern B2 (refer to FIG. 7B). Then, the processing proceeds to step S835.

In step S835, the system control unit 50 determines whether an end operation is performed. If the system control unit 50 determines that the end operation is performed (YES in step S835), the image capturing mode processing is ended. Otherwise (NO in step S835), the processing returns to step S821 to repeat the processing.

As described above, according to the present exemplary embodiment, it is possible to prevent the erroneous operation of the touch operation caused by unintentionally touching the display unit 28 when a user opens or closes the monitor unit 302, or adjusts the angle of the monitor unit 302. Thus, it is possible to improve the operability of the touch operation.

In addition, the system control unit 50 shifts the lock released state of the display unit 28 to the locked state, when the system control unit 50 detects the touch operation (touch down) on the return button 601. Therefore, even if the user touches the return button 601 by mistake with the hand when the user operates the monitor unit 302, the display unit 28 is only shifted to the locked state, and the various settings are not changed. Therefore, no problem occurs for image capturing.

Therefore, the display position of the return button 601 in the touch operation allowed state (lock released state) seen from the user side may not be changed even though the position of the monitor unit 302 is changed. For example, the system control unit 50 displays the return button 601 at the position illustrated in the layout pattern B2 (refer to FIG. 7B), even though the monitor unit 302 is at the "open position" or the "reversal open position".

With such a configuration, the position of the return button 601 seen from the user side is always the same regardless of the position of the monitor unit 302. Therefore, the user can perform the touch operation on the return button 601 easily.

Next, a second exemplary embodiment is described. The present exemplary embodiment can be applied to a variable angle monitor having a mechanism different from that of the variable angle monitor described in the first exemplary embodiment.

FIGS. 9A to 9D are diagrams schematically illustrating a configuration of a digital camera 800 according to the second exemplary embodiment.

The digital camera 800 is provided with a hinge portion 803 (connection portion) that rotatably connects a main body 801 and a monitor unit 802, at a lower portion of the main body 801. The configuration other than that is similar to the configuration of the first exemplary embodiment. Therefore, the description of the similar configuration is omitted.

The monitor unit 802 is connected to the main body 801 of the digital camera 800 with the hinge portion 803 (connection portion) to be rotatable around a third rotation shaft L3, which is parallel to the horizontal direction, and a fourth rotation shaft L4, which is parallel to the direction different from the third rotation shaft L3 (vertical direction to the third rotation shaft L3).

Figure 9A:
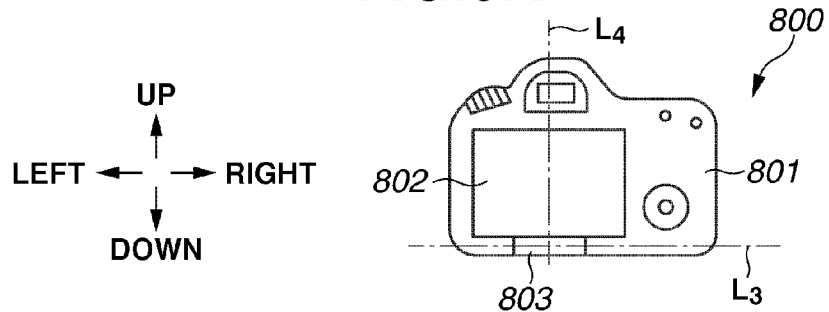
FIGS. 9A to 9D are diagrams schematically illustrating a configuration of a digital camera according to a second exemplary embodiment of the present invention.

FIG. 9A is an external view of the digital camera 800 seen from the back side thereof illustrating a positional relationship between the main body 801 and the monitor unit 802 in a state where the monitor unit 802 is at the "close position". The display screen 281 of the display unit 28 provided in the monitor unit 802 is stored (folded) facing the main body 801.

Figure 9B:
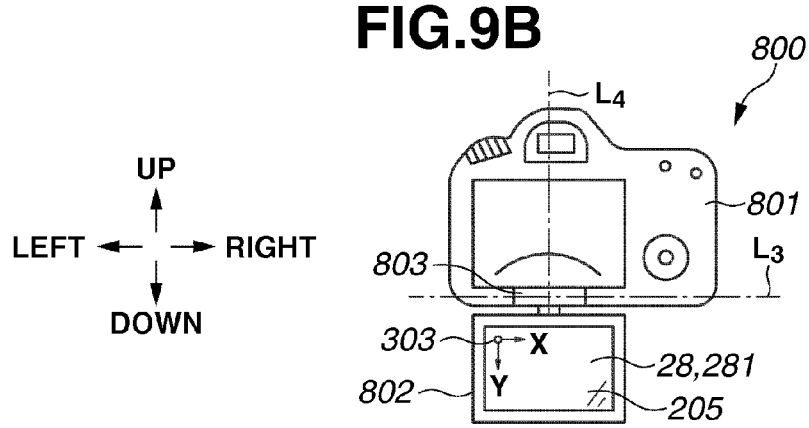

FIG. 9B is an external view of the digital camera 800 seen from the back side thereof illustrating a positional relationship between the main body 801 and the monitor unit 802 in a state where the monitor unit 802 is at the "open position". The display screen 281 of the display unit 28 provided in the monitor unit 302 is opened to look to the same side as the back side of the digital camera 100 (i.e., photographer side).

The user can move the monitor unit 802 from the "close position" to the "open position" by rotating the monitor unit 802 downward (half rotation) around the third rotation shaft L3.

Figure 9C:
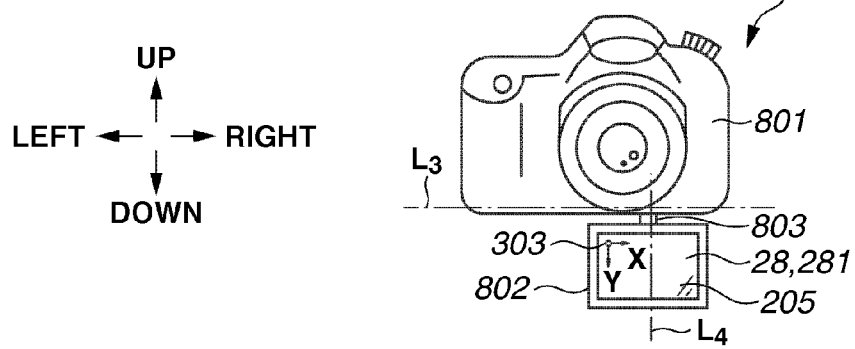

FIG. 9C is an external view of the digital camera 800 seen from the front side thereof illustrating a positional relationship between the main body 801 and the monitor unit 802 in a state where the monitor unit 802 is at the "reversal open position" (first position).

The display screen 281 of the display unit 28 provided in the monitor unit 802 is opened to look to the same side of the front side of the digital camera 800 (i.e., object side). The user can move the monitor unit 802 positioned at the "open position" to the "reversal open position" (first position) by rotating (rotating half) the monitor unit 802 around the fourth rotation shaft L4.

Seen from the back side of the digital camera 800, even though the monitor unit 802 is at the "open position" or at the "reversal open position", the coordinate system 303 is positioned at upper left of the display screen 281 of the display unit 28. Therefore, the system control unit 50 normally keeps the display direction of the various display items between the "open position" and the "reversal open position" (first position). This configuration is different from that of the first exemplary embodiment. In addition, when the through-image is captured, the system control unit 50 reverses right and left of the through-image to display a mirror image.

Figure 9D:
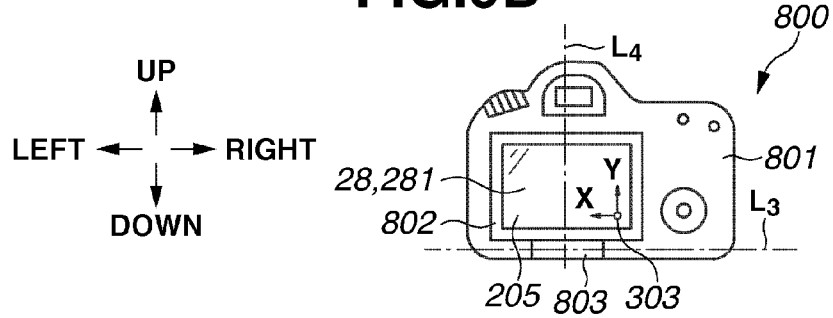

FIG. 9D is an external view of the digital camera 800 seen from the back side thereof illustrating a positional relationship between the main body 801 and the monitor unit 802 in a state where the monitor unit 802 is at the "reversal close position" (second position).

At the "reversal close position" (second position), the monitor unit 802 is closed to the back side of the main body 801 (folded). The display screen 281 of the display unit 28 provided in the monitor unit 302 is exposed to look to the same side as the back side of the digital camera 800 (i.e., user side). The user can move the monitor unit 802 positioned at the "reversal open position" (first position) to the "reversal close position" (second position) by rotating the monitor unit 802 around the fourth rotation shaft L4.

As illustrated in FIG. 9C, seen from the back side of the digital camera 800 in a state where the monitor unit 802 is at the "reversal open position", the coordinate system 303 is positioned at upper left of the display screen 281 of the display unit 28. On the other hand, as illustrated in FIG. 9D, seen from the back side of the digital camera 800 in a state where the monitor unit 802 is in the "reversal close position", the coordinate system 303 is positioned at lower right of the display screen 281 of the display unit 28.

Therefore, the system control unit 50 reverses the display direction on the display unit 28 in right and left, and up and down, when the monitor unit 802 is at the "reversal open position" (first position) and when the monitor unit 802 is at the "reversal close position" (second position). Further, the system control unit 50 displays the through-image with only its up and down being reversed when the monitor unit 802 displays a mirror image of the through-image in a state where the monitor unit 802 is at the "reversal open position" (first position), and the monitor unit 802 is moved to the "reversal close position" (second position). Then, the display is changed to the normal display not the mirror image.

The user often grips the far end portion positioned farther from the hinge portion 801 in the portions of the monitor unit 802 to rotate thereof, so as to increase the moment applied to the monitor unit 802 when the user moves the monitor unit 802 between the "open position" and the "close position" and between the "open position" and the "reversal close position". At that time, the user may touch unintentionally the display screen 281 of the display unit 28 (touch panel 205) with a finger for gripping the monitor unit 802. The position touched by the user is likely to be far in the display unit 28 from the hinge portion 803.

In the second exemplary embodiment, the system control unit 50 does not display the display items allowing touch operation at positions in the display screen 281 of the display unit 28 (touch panel 205) which the user may easily touch unintentionally when the monitor unit 802 is rotated. With such a configuration, an erroneous operation caused by an unintentional touch can be prevented.

Figure 10A:
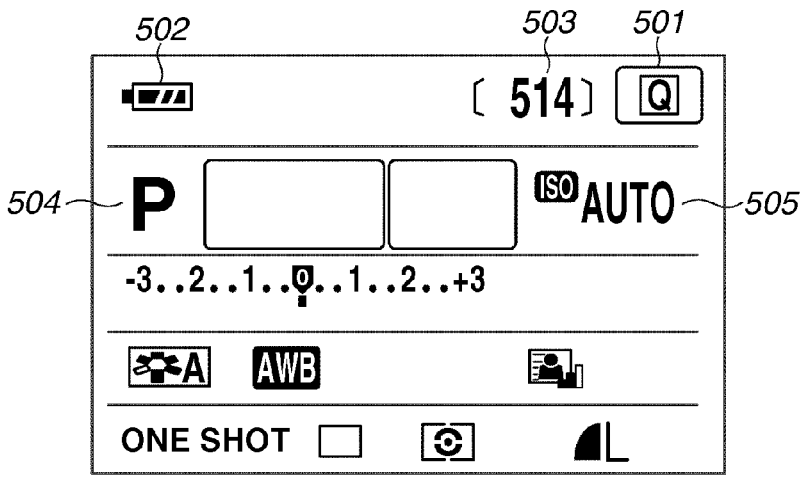
FIGS. 10A and 10B are display examples each on a display unit in a state where the monitor unit is at the "open position" and the "reversal open position".
Figure 10B:
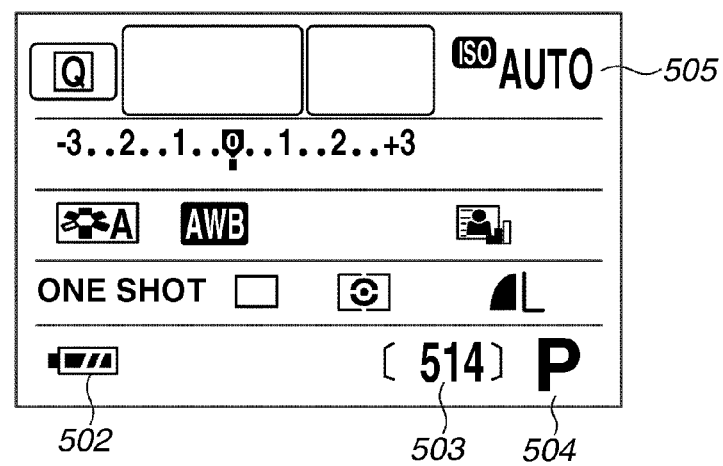

FIGS. 10A and 10B are display examples on the display unit 28 in a state where the monitor unit 802 is respectively at the "open position" and the "reversal open position".

In a state where the monitor unit 802 is at the "open position" or the "reversal open position", the system control unit 50 disposes (updates display) the Q button 501 (first display item), which is the display item allowing touch operation, at an upper portion of the screen so as to be positioned on the near side to the hinge portion 803.

Then, the system control unit 50 disposes (updates display) the display items not allowing touch operation (second display items) at a position farther from the hinge portion 803. With this configuration, even though the user unintentionally touches the display screen 281 of the display unit 28 (touch panel 205) when the user grips the monitor unit 802 to rotate, no display items allowing touch operation are not disposed (displayed) at a position touched by the user. Therefore, an erroneous operation unintentionally performed by the user can be prevented.

In the example illustrated in FIG. 10A, the system control unit 50 displays the Q button 501 (first display item), the battery remaining power display 502, and the remaining photographable number display 503 at a position nearest to the hinge portion 803 (uppermost position). Then, the system control unit 50 displays other display items (second display items) at a position farther (lower side) from the hinge portion 803 than those items.

At that time, the system control unit 50 keeps the relative positional relationship between the display items (a plurality of second display items) other than the Q button 501 (first display item), battery remaining power display 502, and the remaining photographable number display 503. With this configuration, the layout of the display items other than the column in which the Q button 501 is displayed, is not changed. Therefore, even if the position of the Q button 501 is changed, the user can easily understand which item is displayed at which position.

FIG. 10B illustrates an example in which the positions of the Q button 501 and the image capturing mode icon 504 are replaced with each other compared with the examples illustrated in FIG. 6A and FIG. 10A.

The image capturing mode icon 504 does not function as a touch icon allowing touch operation, even after the lock is released according to a touch down operation on the Q button 501. Therefore, even after the lock is released, the position of the touch icon allowing touch operation does not change. Therefore, the touch operation more intuitively operable and causing fewer erroneous operations can be provided.

Figure 10C:
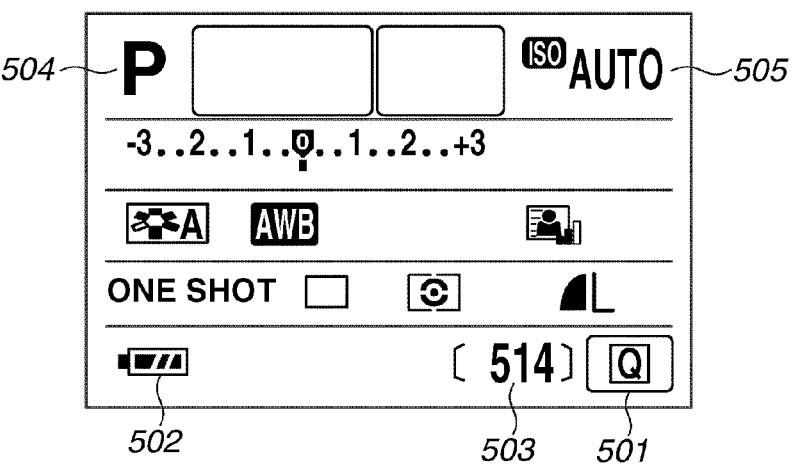
FIG. 10C is a diagram illustrating a display example when the display unit is in a locked state at the "reversal close position".

FIG. 10C is a display example in the lock state of the display unit 28 at the "reversal close position". This arrangement is similar to that in FIG. 6A described above.

In a case where the monitor unit 802 is moved from the "reversal open position" to the "reversal close position", the system control unit 50 displays each display item in a state where right and left, and up and down of each display item is reversed in direction and arrangement. With this operation, positions of the display items seen from the user can be kept unchanged.

However, in the second exemplary embodiment, the system control unit 50 changes the position of the Q button 501 seen from the user, which is a display item allowing touch operation. More specifically, the system control unit 50 disposes the Q button 501 at an upper portion seen from the user (updates display) in a state where the monitor unit 802 is at the "reversal open position", and disposes the Q button 501 (updates display) at a lower portion in a state where the monitor unit 802 is at the "reversal close position".

This arrangement is employed so that the Q button 501, which is a display item allowing touch operation, is arranged at a closer portion to the hinge portion 803, and the display items, which are not display items allowing touch operation, are arranged at a farther portion from the hinge portion 803.

Thus, in the second exemplary embodiment, the system control unit 50 reverses the display direction of each display item in up and down, in a case where the user has moved the monitor unit 802 between the "reversal open position" and the "reversal close position". Further, in this case, the system control unit 50 changes the arrangement so that the Q button 501, which is a display item allowing touch operation, is disposed at a father portion from the hinge portion 803.

In addition, this operation is realized by the following processing. First, in the above-described processing illustrated in FIG. 8, the system control unit 50 updates the display illustrated in FIG. 10A or FIG. 10B to the layout pattern A1, and the display illustrated in FIG. 10C to the layout pattern B1.

Further, the processing performed in step S810 and step S832 is replaced with processing to determine whether the position of the monitor unit 802 is at the "reversal open position" (first position) or the "open position". If the system control unit 50 determines "NO" in step S810 and step 832, the monitor unit 802 is at the "reversal close position" (second position).

While the present invention has been described with reference to exemplary embodiments, it is to be understood that the invention is not limited to the disclosed exemplary embodiments. The present invention can be modified in various ways without departing from the technical thought or essential features thereof. Further, the exemplary embodiments described above are to be considered as an example of the present invention, and it is possible to combine the exemplary embodiments as appropriate.

Further, the control performed by the system control unit 50 can be realized by a single hardware device. Alternatively, a plurality of hardware devices can share the processing to control the whole apparatus.

In addition, in the exemplary embodiments described above, the present invention is applied to a digital camera as an example, but the present invention is not limited thereto. The present invention can be applied to any apparatus provided with a display unit capable of displaying information and a touch panel allowing touch operation. For example, the present invention can be applied to a personal computer, a personal digital assistance (PDA), a mobile phone terminal, a portable image viewer, a printing apparatus with a display, a digital photo frame, a music player, a game machine, an electronic book reader, and an electronic dictionary.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclose exemplary embodiments. The scope of the following claims is to be accorded the broadest interpretation so as to encompass all modifications, equivalent structures, and functions.

This application claims priority from Japanese Patent Application No. 2012-070347 filed Mar. 26, 2012, which is hereby incorporated by reference herein in its entirety.

What is claimed is:

1. A display apparatus comprising:
a monitor unit provided with a display unit and rotatably connected to a main body via a connection portion;
a touch detection unit configured to detect a touch operation on the display unit;
a position detection unit configured to detect at least a first position and a second position, each of which is a relative position of the monitor unit with respect to the main body, wherein the second position is a position obtained by rotation from the first position on a rotation axis, and the monitor is upside down when in the second position with respect to the first position; and a control unit configured to perform control, in a case where the relative position, detected by the position detection unit, of the monitor unit is the first position, to display a first display item at a position nearer to the connection portion than a second display item and to display the second display item at a position nearer to the connection portion than a third display item on the display unit, wherein the first display item allows processing to be performed in response to a touch operation thereon and the second display item and the third display item show respective information and does not allow processing to be performed in response to a touch operation thereon, and to perform control to reverse display orientation of the display unit vertically and horizontally and to display the third display item at a position nearer to the connection portion than the second display item, and to display the first display item and the second display item with a changed relative position between the first display item and the second display item so that the first display item is displayed at a position nearer to the connection portion than the second display item and the third display item on the display unit, in response to a change of the relative position, detected by the position detection unit, of the monitor unit from the first position to the second position that is the position obtained by rotation from the first position on the rotation axis.

2. The display control apparatus according to claim 1, wherein the control unit reverses right and left, and up and down directions of the first display item and the second display item, in response to the change of the relative position from the first position to the second position.

3. The display control apparatus according to claim 1, wherein the first display item is a display item for receiving an instruction to change another display item which does not allow processing to be performed in response to a touch operation thereon to a display item which allows processing to be performed in response to a touch operation thereon, and
wherein the control unit changes the another display item which does not allow processing to be performed in response to the touch operation thereon when the control unit detects a touch operation on the first display item.

4. The display control apparatus according to claim 1, wherein the first display item is a display for receiving an instruction to change the second display item to a display item allowing touch operation, and
wherein the control unit changes the second display item to allow touch operation when the control unit detects a touch operation on the first display item.

5. The display control apparatus according to claim 1, wherein the first display item is a display item for receiving an instruction to change an area other than an area where the first display item is displayed to allow touch operation, and
wherein the control unit changes the area other than the area where the first display item is displayed to allow touch operation in a case where the control unit detects a touch operation on the first display item.

6. The display control apparatus according to claim 1, wherein the control unit does not change a positional relationship between a plurality of display items, when the first display item is displayed nearer to the connection portion than the plurality of display items.

7. The display control apparatus according to claim 1, wherein the control unit does not change a positional relationship between a plurality of display items other than the first display item and the second display item, when the first display item is displayed nearer to the connection portion than the plurality of display items.

8. The display control apparatus according to claim 1, wherein the control unit replaces the positions of the first display item and one of a plurality of display items with each other to display on the display unit the first display item nearer to the connection portion than the plurality of display items.

9. The display control apparatus according to claim 3, wherein the control unit replaces the first display item with a third display item for receiving an instruction not to allow touch operation on the other display item, when the control unit detects a touch operation on the first display item.

10. The display control apparatus according to claim 4, wherein the control unit replaces the first display item with a third display item for receiving an instruction not to allow touch operation on the second display item, when the control unit detects a touch operation on the first display item.

11. The display control apparatus according to claim 1,
wherein the first position is a position where the monitor unit is opened in a horizontal direction in a normal orientation from the main body and a display screen of the display unit looks to a same side as a back side of the main body, and
wherein the second position is a position where the monitor unit is opened to the horizontal direction in the normal orientation from the main body and the display screen of the display unit looks to a same side as a front side of the main body.

12. The display control apparatus according to claim 1,
wherein the first position is a position where the monitor unit is opened in a down direction in a normal orientation from the main body and a display screen of the display unit looks to a same side as a back side of the main body, and
wherein the second position is a position where the monitor unit is opened in the down direction in the normal orientation from the main body and the display screen of the display unit looks to a same side as a front side of the main body.

13. The display control apparatus according to claim 9, wherein the control unit displays the third display item at a position nearer to the connection portion than the second display item.

14. The display control apparatus according to claim 1, further comprising an image capturing unit configured to capture an object image to generate image data, wherein the display unit can display the image data generated by the image capturing unit.

15. A control method for controlling a display control apparatus including a monitor unit provided with a display unit connected rotatably to a main body via a connection portion, and a touch detection unit configured to detect a touch operation on the display unit, the method comprising:
determining at least a first position and a second position, each of which is a relative position of the monitor unit with respect to the main body, wherein the second position is a position obtained by rotation from the first position on a rotation axis, and the monitor is upside down when in the second position with respect to the first position; and
performing control, in a case where the relative position of the monitor unit is the first position, to display a first display item at a position nearer to the connection portion than a second display item and to display the second display item at a position nearer to the connection portion than a third display item on the display unit, wherein the first display item allows processing to be performed in response to a touch operation thereon and the second display item and the third display item show respective information and does not allow processing to be performed in response to a touch operation thereon, and to perform control to reverse display orientation of the display unit vertically and horizontally and to display the third display item at a position nearer to the connection portion than the second display item, and to display the first display item and the second display item with a changed relative position between the first display item and the second display item so that the first display item is displayed at a position nearer to the connection portion than the second display item and the third display item on the display unit, in response to a change of relative position of the monitor unit from the first position to the second position that is the position obtained by rotation from the first position on the rotation axis.

16. A non-transitory computer readable recording medium storing a program for causing a computer to perform a control method of a display apparatus including a monitor unit provided with a display unit and rotatably connected to a main body via a connection portion, and a touch detection unit configured to detect touch operation on the display unit, the control method comprising:

determining at least a first position and a second position, each of which is a relative position of the monitor unit with respect to the main body, wherein the second position is a position obtained by rotation from the first position on a rotation axis, and the monitor is upside down when in the second position with respect to the first position; and performing control, in a case where the relative position of the monitor unit is the first position, to display a first display item at a position nearer to the connection portion than a second display item and to display the second display item at a position nearer to the connection portion than a third display item on the display unit, wherein the first display item allows processing to be performed in response to a touch operation thereon and the second display item and the third item show respective information and does not allow processing to be performed in response to a touch operation thereon, and to perform control to reverse display orientation of the display unit vertically and horizontally and to display the third display item at a position nearer to the connection portion than the second display item, and to display the first display item and the second display item with a changed relative position between the first display item and the second display item so that the first display item is displayed at a position nearer to the connection portion than the second display item and the third display item on the display unit, in response to a change of the relative position of the monitor unit from the first position to the second position that is the position obtained by rotation from the first position on the rotation axis.

17. The display apparatus according to claim 1, wherein an aspect ratio of the monitor unit does not change between cases where the monitor unit is at the first position and where the monitor unit is at the second position.

18. The display apparatus according to claim 1, wherein the first display item is displayed in a half area, nearer to the connection portion, of the display unit in both cases where the monitor unit is positioned at the first position and where the display unit is positioned at the second position.

19. The display apparatus according to claim 1, wherein the first display item is displayed at a position, in an area of the display unit, nearest to the connection portion among other items to be displayed on the display unit in both cases where the monitor unit is positioned at the first position and where the display unit is positioned at the second position.

* * * * *